US009676098B2

(12) United States Patent
Hemken

(10) Patent No.: US 9,676,098 B2
(45) Date of Patent: Jun. 13, 2017

(54) DATA COLLECTION FROM LIVING SUBJECTS AND CONTROLLING AN AUTONOMOUS ROBOT USING THE DATA

(71) Applicant: Heinz Hemken, Foster City, CA (US)

(72) Inventor: Heinz Hemken, Foster City, CA (US)

(*) Notice: Subject to any disclaimer, the term of this patent is extended or adjusted under 35 U.S.C. 154(b) by 103 days.

(21) Appl. No.: 14/815,624

(22) Filed: Jul. 31, 2015

(65) Prior Publication Data
US 2017/0028551 A1    Feb. 2, 2017

(51) Int. Cl.
B25J 9/16    (2006.01)

(52) U.S. Cl.
CPC ........................... B25J 9/163 (2013.01)

(58) Field of Classification Search
CPC ..... B25J 9/163; B25J 3/00; B25J 9/109; B25J 9/1656; B25J 9/1664; B25J 9/1692; B25J 9/1694; B25J 13/00; B25J 13/08
USPC ................................... 73/488, 491
See application file for complete search history.

(56) References Cited

U.S. PATENT DOCUMENTS

| | | |
|---|---|---|
| 5,673,367 A | 9/1997 | Buckley |
| 6,070,269 A | 6/2000 | Tardif |
| 6,377,281 B1 | 4/2002 | Rosenbluth |
| 6,834,436 B2 | 12/2004 | Townsend et al. |
| 7,024,276 B2 | 4/2006 | Ito |
| 7,664,571 B2 | 2/2010 | Gonzalez-Banos |
| 7,981,057 B2 | 7/2011 | Stewart |
| 8,078,321 B2 | 12/2011 | Iba |
| 8,106,911 B2 | 1/2012 | Gordon |
| 8,224,652 B2 | 7/2012 | Wang |
| 8,265,791 B2 | 9/2012 | Song |
| 8,315,740 B2 | 11/2012 | Hasegawa |
| 8,744,627 B2 | 6/2014 | Wieland |

(Continued)

FOREIGN PATENT DOCUMENTS

AU    WO2004084725 A1    10/2004

OTHER PUBLICATIONS

Koenemann, Real-time Imitation of Human Whole-Body Motions by Humanoids, URL: http://www2.informatik.uni-freiburg.de/~burgetf/pub/koenemann14icra.pdf.

(Continued)

Primary Examiner — Lisa Caputo
Assistant Examiner — Philip Cotey
(74) Attorney, Agent, or Firm — Chhabra Law Firm, PC

(57) ABSTRACT

Using various embodiments, methods, systems, and apparatuses are disclosed for capturing the behavior of living subjects, where the data can be processed by a machine-learning algorithm to control an autonomous robot. In one embodiment, using the data captured by a user performing everyday operations, the autonomous robot can behave in a substantially similar manner as the living subject did in the environment where the behavior capture sessions of the living subject were carried out. Further, once the autonomous robot is provided with the processed data, the actions of the robot can iteratively be stored and processed by the machine learning algorithm to further refine the robot's movements performing the everyday operations. In another embodiment, behavior recorded from the living subject can be processed such that the autonomous robot is able to speak and understand spoken speech similar to that which occurred most frequently in the behavior capture sessions.

20 Claims, 11 Drawing Sheets

(56) References Cited

U.S. PATENT DOCUMENTS

| | | | |
|---|---|---|---|
| 8,751,041 B2 | 6/2014 | Moon | |
| 8,781,624 B2 | 7/2014 | Hodgins | |
| 8,843,236 B2 | 9/2014 | Barajas | |
| 8,925,392 B2 | 1/2015 | Esposito | |
| 2007/0108109 A1* | 5/2007 | Erlandsson-Warvelin | B25J 9/1694 209/629 |
| 2007/0233318 A1 | 10/2007 | Lei | |
| 2009/0132088 A1* | 5/2009 | Taitler | G05B 19/42 700/264 |
| 2010/0103106 A1* | 4/2010 | Chui | G06F 3/017 345/166 |
| 2010/0298976 A1* | 11/2010 | Sugihara | A63H 11/20 700/248 |
| 2011/0118870 A1* | 5/2011 | Sugihara | A63H 11/20 700/245 |
| 2013/0040763 A1 | 2/2013 | Davidson | |
| 2013/0054021 A1 | 2/2013 | Murai | |
| 2013/0054028 A1 | 2/2013 | Lee | |
| 2013/0211587 A1 | 8/2013 | Stephens | |
| 2013/0211594 A1 | 8/2013 | Stephens | |
| 2013/0245824 A1* | 9/2013 | Barajas | B25J 9/1664 700/253 |
| 2013/0345875 A1* | 12/2013 | Brooks | B25J 9/0087 700/259 |
| 2014/0065586 A1 | 3/2014 | Gabbai | |
| 2014/0371906 A1 | 12/2014 | Barajas | |
| 2015/0051734 A1 | 2/2015 | Zheng | |
| 2015/0057984 A1 | 2/2015 | Nicoletti | |
| 2015/0075303 A1 | 3/2015 | Hericks | |
| 2015/0290795 A1* | 10/2015 | Oleynik | G05B 19/42 700/257 |
| 2015/0336268 A1* | 11/2015 | Payton | B25J 9/163 700/261 |

OTHER PUBLICATIONS

Billard, Robot learning by demonstration, URL: http://www.scholarpedia.org/article/Robot_learning_by_demonstration.

Liu, Imitation control for biped robot using wearable motion sensor, Journal of Mechanisms and Robotics, v 2, n 2, p. 1-6, May 2010 URL: http://www.mech.kochi-tech.ac.jp/liutao/ASME-2.pdf.

https://www.xsens.com/company/ (Author unknown).

\* cited by examiner

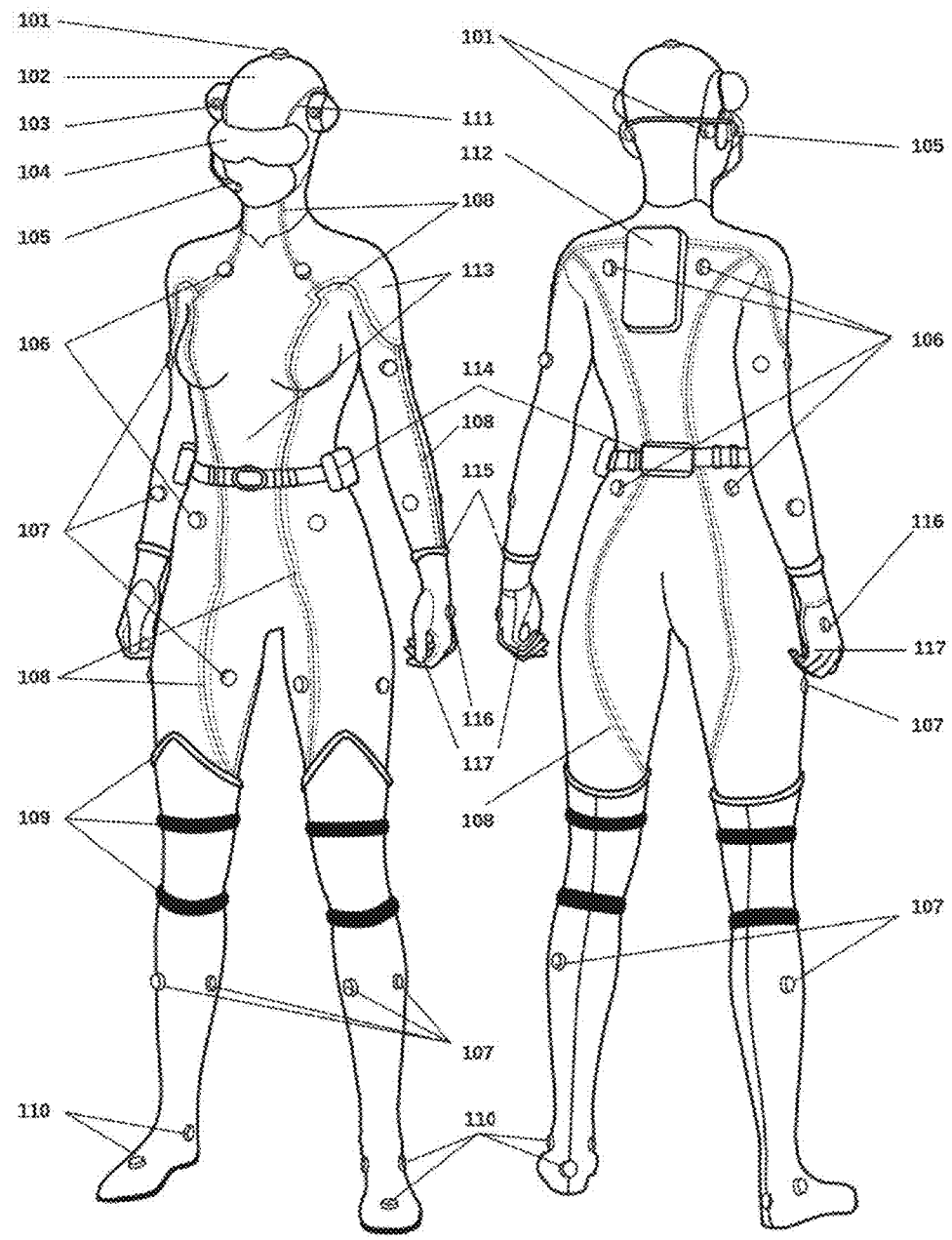
FIG. 1A    100A

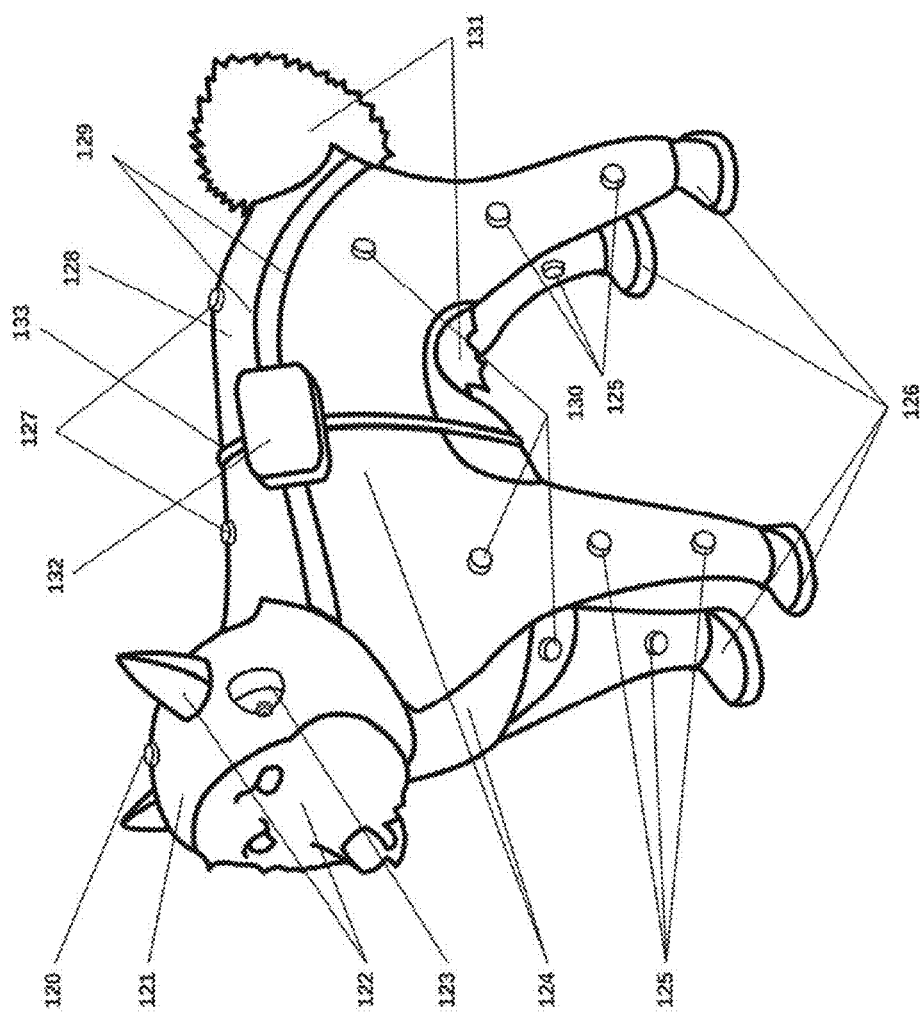

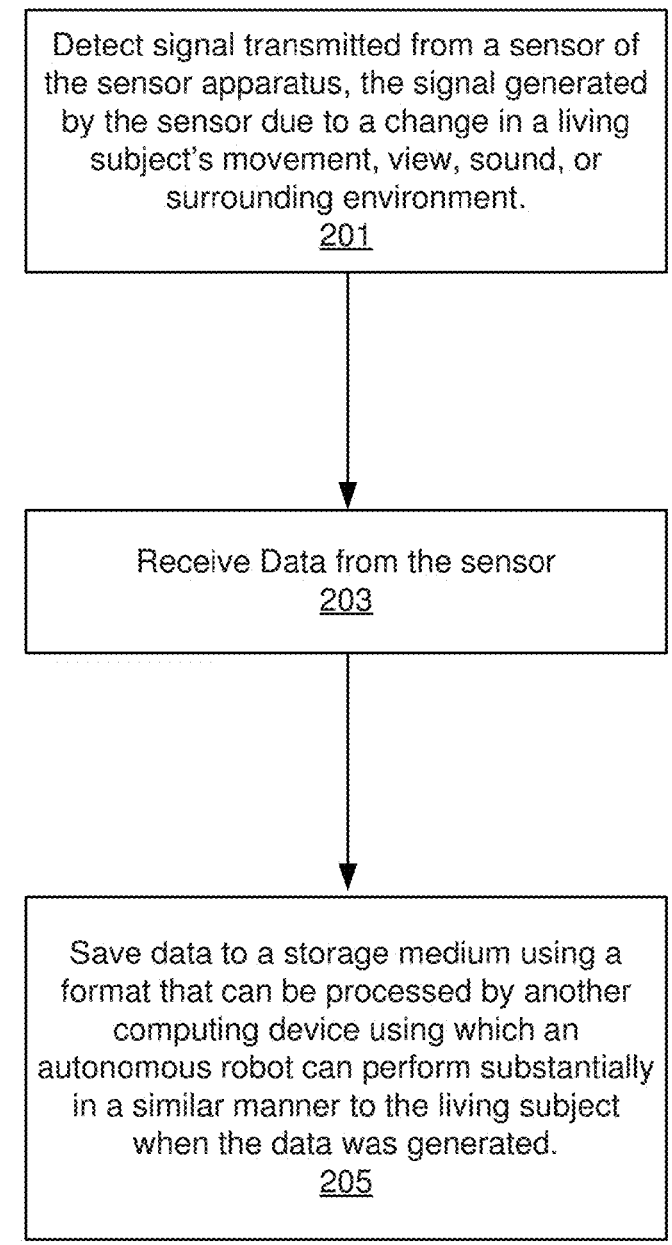
FIG. 2    200

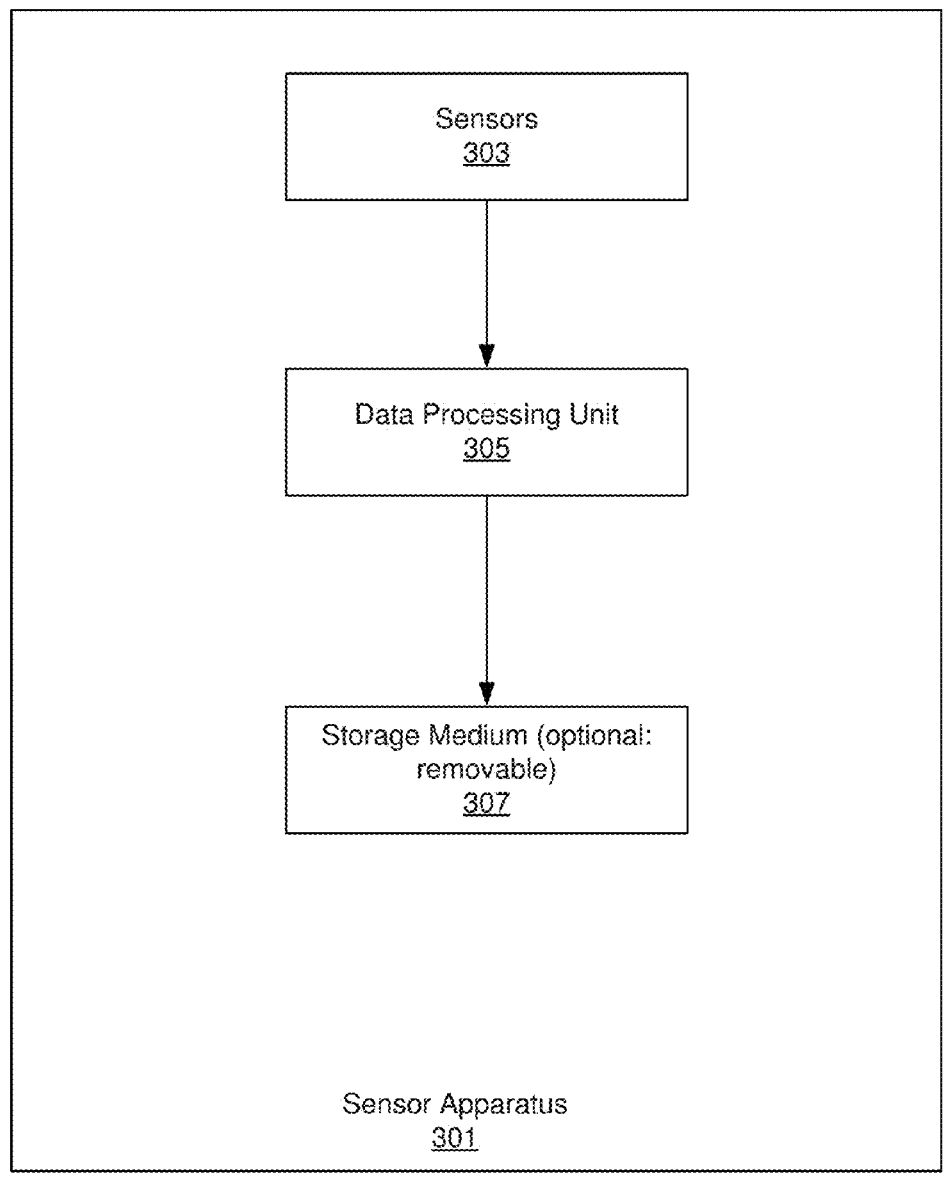
FIG. 3    300

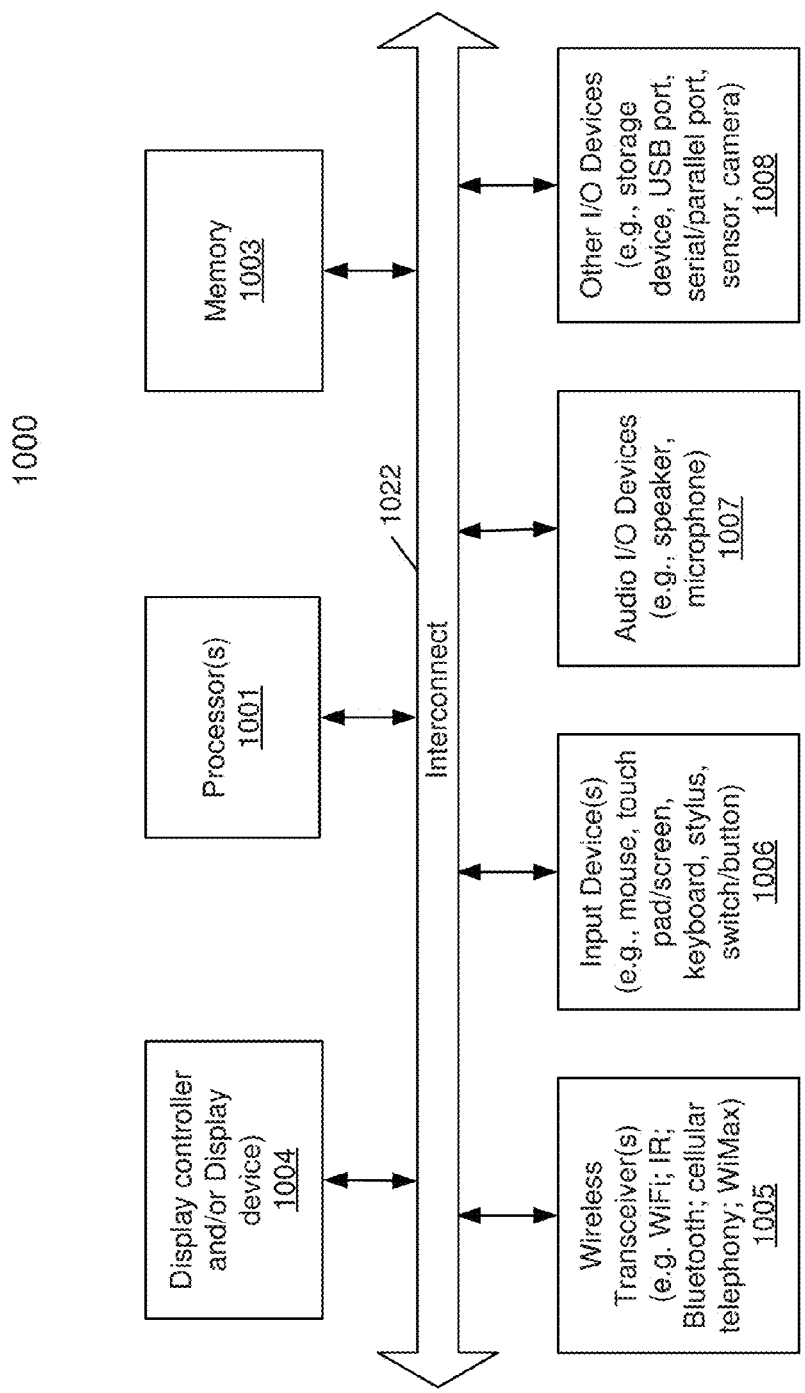

DATA COLLECTION FROM LIVING SUBJECTS AND CONTROLLING AN AUTONOMOUS ROBOT USING THE DATA

CROSS REFERENCE TO RELATED APPLICATIONS

None.

FIELD OF THE INVENTION

Embodiments of the present invention relates generally to the field of autonomous robots. More particularly, embodiments of the invention relate to data collection to be used for the purpose of teaching autonomous robots tasks that can be performed by humans.

BACKGROUND OF THE INVENTION

Robots have been used by mankind to perform relatively simplistic tasks for years, Typically, a robot is programmed to perform the relatively simplistic task (e.g., assembling a portion of a car), by the displacement or movement of a mechanical appendage using a programmable controller. Robots can also be programmed to perform other simplistic tasks like moving, hindering obstacle avoiding, etc.

In such systems, the need to perform tasks requires the controller to be programmed in advanced or controlled by a user. Further, Artificial Intelligence (AI) techniques can be implemented to reduce the reliance of a human operator or the need to re-configure or reprogram the controller. However, a known limitation in AI research includes providing the robot with generalized intelligence (in a controlled environment) so that the robot can perform actions similar to a living subject. Thus, what are needed are methods, systems, devices, and apparatuses using which data can be collected in a controlled environment. Further, such data, when provided to an AI program or algorithm, should be able to provide an autonomous robot with general intelligence in the controlled environment.

SUMMARY OF THE DESCRIPTION

Using various embodiments, methods, apparatuses, systems and techniques, data for motions and movements, changes in posture, changes in position, vocalizations, gestures, grasping, gait, and other bodily dynamics of living subjects are captured using sensors. Using the resulting sensor data, a supervised learning algorithm or program (AI program) implemented in a machine-learning computer program can be programmed to control an autonomous robot in a substantially similar manner as the living subject. Further, in one embodiment, the data from the controlled autonomous robot can also be collected and iteratively provided to the AI program to further facilitate learning and refinement of the robot's actions.

In one embodiment, data is periodically (e.g., every microsecond, millisecond, second, etc.) collected from the living subject in a controlled environment. The data collected from the living subject and its surrounding environment can then be provided to an AI program using which an autonomous robot can perform substantially similar actions as performed by the living subject. In one embodiment, the data collected from the living subject includes the moment to moment state and dynamics of the living subject's body to supply all of the information needed for the movement of the autonomous robot situated in a similar environment as the living subject. In one embodiment, a sensor apparatus is provided using which numerous sensors measurement sessions with living subjects are collected in order to provide enough data to produce a suitably trained machine-learning program that can effectively control an autonomous robot, providing generalized intelligence needed to perform similar tasks/actions as were performed by the living subject in the controlled environment.

After training the machine-learning program and during everyday operation, the robot is can behave very much like the living subjects did in the settings where the sensor measurement sessions were carried out. The robot is expected to move around the setting and perform the same sorts of tasks in it as did the living subjects during the sensor measurement sessions, and to respond to actions and events in a similar way. In the case of sensor data recorded from human subjects the robot can also eventually speak and understand spoken speech, although this can be limited to speech that occurred frequently in the sensor measurement sessions.

To capture the data, in one embodiment, a sensor apparatus is used for periodically gathering data from a living subject for use by an autonomous robot. The apparatus includes a covering material configured to cover at least a portion of the living subject, the covering material including at least one of garments, harnesses, straps, belts, hats, caps, headgear, helmets, shoes, boots, footwear, gloves, mitts, simulated grippers, or hosiery. The sensor apparatus further includes sensors to gather measurements of motions, movements, change in posture, change in position, of the living subject or the immediate environment of the living subject, in the controlled environment, coupled to the covering material. To gather such data, the sensor apparatus can, in one embodiment, include, an accelerometer, bend sensor, stretch sensor, pressure sensor, or proximity sensor, wherein the sensors can measure movements, bending, rotations, or angular displacement of the body of the living subject including the limbs, joints, and extremities of the living subject in a controlled environment. Further, the sensor apparatus includes, a data computing device connected to the one or more sensors, where the data computing device can periodically capture and save the data generated from the one or more first sensors in a data file on a storage medium. The data, once saved, can be retrieved from the storage medium and processed for use by the autonomous robot, where the autonomous robot, based on the processed data, can exhibit substantially the same movement or actions exhibited by the living subject while the data was being captured.

In another embodiment, the sensor apparatus can also include sensors coupled to the covering material, where the sensors can be video cameras that can provide a plurality of views of the surroundings around the living subject in the controlled environment. In one embodiment, the data generated by the one or more second sensors includes data related to gestures, grasping, gait, or other bodily dynamics and multi-media recordings of the living subject and the immediate environment of the living subject.

In yet another embodiment, the sensor apparatus can include sensors coupled to the covering material to capture auditory sounds signals (e.g., microphone) transmitted from or around the living subject in the controlled environment, where the data relates to vocalizations of the living subject and the immediate environment of the living subject. In another embodiment, the sensor apparatus can include sensors coupled to the covering material, where the sensors can be a temperature sensor, humidity sensor, barometric pressure sensor, radioactivity detector, magnetic field detector, electromagnetic radiation detector, or airborne chemical detectors from or around the living subject in the controlled environment, where the data generated by sensors includes data related to the environment around the living subject.

In one embodiment, the data computing device, at each periodic capture of data, uniquely tags the data generated from the one or more sensors with an identification code, each tag identifying the sensor from which the data was generated. In another embodiment, the data generated at each periodic capture is saved in a track or channel in the data file.

The data processing device of the sensor apparatus can detect a signal transmitted from any sensor of the sensor apparatus, and based on the detection, receive data from the sensor, and store it to a storage medium.

BRIEF DESCRIPTION OF THE DRAWINGS

The present invention is illustrated by way of example and not limitation in the figures of the accompanying drawings in which like references indicate similar elements.

FIG. 1A illustrates a sensor apparatus adorned by a human living subject to gather data based on user behavior, according to one embodiment of the present invention.

FIG. 1B illustrates sensor apparatus adorned by non-human living subject to gather data based on the non-human living subject's behavior, according to one embodiment of the present invention.

FIG. 2 illustrates a flow chart of gathering and saving data generated by the sensors of the sensor apparatus, according to one embodiment of the present invention.

FIG. 3 illustrates a block diagram of a sensor apparatus and its components, according to one embodiment of the present invention.

FIG. 10 describes a block diagram illustrating a digital processing device that can be used in various embodiments of the present invention.

DETAILED DESCRIPTION

Figure 4:
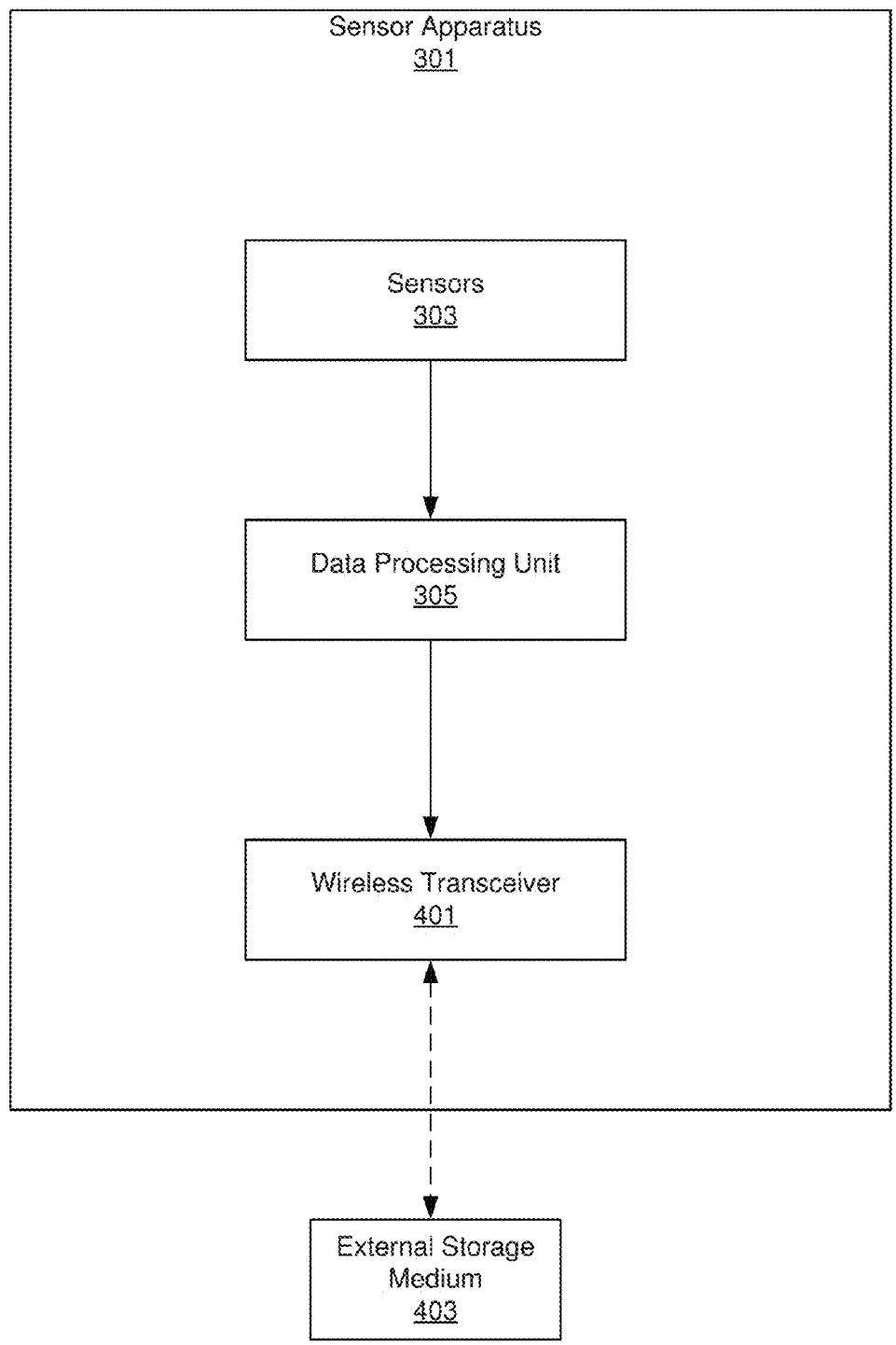
FIG. 4 illustrates a block diagram of a sensor apparatus and its components, according to another embodiment of the present invention.

Various embodiments and aspects of the inventions can be described with reference to details discussed below, and the accompanying drawings can illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

FIG. 1A illustrates a sensor apparatus 100A adorned by a human living subject to gather data based on user behavior, according to one embodiment of the present invention. FIG. 1A, according to one embodiment, illustrates a sensor apparatus in the form of a garment or covering material that can be used for capturing and recording the motions and movements, changes in posture, changes in position, vocalizations, gestures, grasping, gait, and other bodily dynamics as well as multi-media recordings of a living human subject. As illustrated, the sensor apparatus 100A can have various sensor pods connected or coupled to the covering material of the sensor apparatus. Although as illustrated, the covering material covers the entire living subject, in any embodiment, the covering material can be configured to cover at least a portion of the living subject, using at least one of garments, harnesses, straps, belts, hats, caps, headgear, helmets, shoes, boots, footwear, gloves, mitts, simulated grippers, or hosiery.

The sensor pods described herein can include but are not limited to multi-axis acceleration sensors each capable of detecting at its mounting point the tilt, orientation, and motion including static acceleration of gravity as well as dynamic acceleration resulting from motion, shock, or vibration; microphones; video cameras; proximity sensors; bend sensors; pressure sensors; temperature, humidity, and barometric pressure sensors; radiation detectors; multi-spectral video; subsonic or ultrasonic sound sensors, etc. In one embodiment, sensor pods 101 can be coupled to a headpiece of the covering material to capture head movement, rotation, or orientation. In another embodiment, the covering material of the headpiece can be coupled or embedded with pressure, bend, stretch, proximity, or other sensors in the headpiece material 102 of the covering material. In one embodiment, the headpiece pod 103 can be coupled with video and/or audio capture devices as well as other sensors. In another embodiment, goggles 104 can be used by living subject to view video captured by headpiece video cameras during sensor data capture sessions. In yet another embodiment, headset 105 (with microphone or any audio capturing device) can be used to capture vocalizations made by living subject and headphones to provide audio feedback from selected sensors, or microphones.

In another embodiment, sensor pods 106 can be coupled to any major body region to capture the region's movement, rotation, orientation, etc. Similarly, in another embodiment, sensor pods 107 can be coupled or connected to the limbs and extremities to capture their movement, rotation, orientation, etc. In one embodiment, seams 108 in the covering material can be introduced for size adjustment and for embedding sensors, electrical conductors, communications cables, etc. As illustrated, in one embodiment, thickened regions 109 of the covering material can be created where larger devices, sensors, cables, etc. may be embedded into the thickened regions 109. In one embodiment, sensor pods 110 on footwear to capture their movement, rotation, orientation, external object proximity, etc. In one embodiment, seams 111 in the headpiece of the covering material can be introduced for size adjustment and for embedding sensors, electrical conductors, communications cables, etc. Further, in one embodiment, the sensor apparatus garment can also have at least one of attached fixtures 112 to include computer systems, storage systems, battery systems, or any larger devices that cannot be conveniently embedded in the material of the garment itself.

In another embodiment covering material 113 of the sensor apparatus can comprise pressure, bend, stretch, proximity, or other sensors embedded in the garment material. In yet another embodiment, the sensor apparatus can have at least one fixture 114 to contain computer systems, storage systems, battery systems, or any smaller devices that cannot be conveniently embedded in the material of the garment itself attached to at least one of belts or harnesses. In another embodiment, thickened regions 115 can be introduced at hand-pieces where devices, sensors, cables, etc. can be embedded. Sensor pods 116, in another embodiment, on the hand-pieces can be placed to capture the movement, rotation, orientation, external object proximity, etc of the hands. In yet another embodiment, sensors on finger or gripper regions 117 can be placed to detect grasping force and other measurements when the handpiece manipulates objects.

In one embodiment, the living subject wears the sensor apparatus described herein, and as the living subject moves and speaks, a data processing unit of the sensor apparatus can periodically capture and store at least one objective measurement of the living subject's motions and movements, changes in posture, changes in position, vocalizations, gestures, grasping, gait, or other bodily dynamics, as well as real-time video and audio of what is occurring around and in front of the living subject.

In one embodiment, the data processing unit of sensor apparatus can store the data generated by the sensors to a storage medium, in a format that can be retrieved and processed by another computing device for use by an autonomous robot in a manner, such that the autonomous robot can exhibit substantially the same movement or action exhibited by the living subject while the data was being captured.

FIG. 1B illustrates a sensor apparatus adorned by non-human living subjects to gather data based on the non-human living subject's behavior, according to one embodiment of the present invention. Similar to FIG. 1A, FIG. 1B illustrated a sensor apparatus 100B adorned by a non-human living subject (e.g., mammal). As illustrated herein, sensor pod 120 on headpiece can capture the movement, rotation, orientation, etc. of the head. The headpiece can also include pressure, bend, stretch, proximity, and other sensors embedded in the headpiece material 121 of the covering material. In this embodiment, the headpiece of the covering material can expose the living subject's face and ears 122. The headpiece can also include headpiece pods 123 on either side of head with video and audio capture devices as well as other sensors to capture the movement, rotation, orientation, etc. of the head of the living subject. In one embodiment, the covering material 124 of the sensor apparatus can have pressure, bend, stretch, proximity, and other sensors embedded in the covering material.

In one embodiment, sensor pods 125 can be positioned on the limbs and extremities to capture their movement, rotation, orientation, etc., similarly, sensor pods 126 can be placed in footwear to capture their movement, rotation, orientation, external object proximity, etc. Sensor pods 127 and 130 can be placed on major body regions to capture their movement, rotation, orientation, etc. In one embodiment, the covering material at the back side 128 of the non-human living subject can also include pressure, bend, stretch, proximity, and other sensors embedded in the garment material. Seams 129 in covering material can be introduced for size adjustment and for embedding sensors, electrical conductors, communications cables, etc. Openings and exposed areas in covering material 131 allow for tail as well as reproductive and excretory parts of the anatomy to move freely and have unrestricted functionality; the sensor apparatus' covering material can have at least one attached fixtures 132 to contain computer systems, storage systems, battery systems, or any larger devices that cannot be conveniently embedded in the material of the garment itself. In one embodiment, thickened regions 133 can be introduced on the covering material to embed larger devices, sensors, cables, etc.

In one embodiment, the sensor apparatus comprises is a snug-fitting jumpsuit-style garment worn by a living subject as the covering material, as illustrated in FIGS. 1A & 1B. The garment affixes or holds the sensor apparatus in close proximity to the living subject and consistently locates each sensor in its proper place. In this embodiment, the sensor apparatus gathers and stores data representing the subject's motions and movements, changes in posture, changes in position, vocalizations, gestures, grasping, gait, and other bodily dynamics, and information about their surrounding environment including multiple channels of audio and video, as well as other data about the surrounding environment. In another embodiment, the sensor apparatus garment can also be an integral part of a corresponding robot's structure, comprising its permanent outer covering. The garment comprises at least one sensor that can be of various kinds and one or more computer systems capable of storing the data produced by the sensors in an organized and time-consistent manner and making it available for later retrieval by other computer systems within the sensor apparatus or outside of the sensor apparatus.

In an embodiment, a living subject wears the sensor apparatus garment during sessions in which the living subject's bodily movements and/or speech are captured by the sensors and microphones of the sensor apparatus garment while details of the surrounding environment are captured by at least one video camera and/or microphone. Many sensor measurement sessions are performed with the living subject. In all of them the subject is playing a role that the robot can eventually play on its own in an autonomous manner.

In order for the machine-learning approach to be effective, the behaviors being captured should pertain to a relatively well-defined range of human activities. This can provide a finite variety of behaviors that are repeated over and over again with small or large variations. The spoken language of the living subject can naturally also be confined to the range of verbal exchanges with human subjects present in the training sessions but who are not necessarily wearing a sensor apparatus. These human subjects will, as a class, comprise the future clients of the behavior-generating robot, the consumers of its services. By having more than one living subject wear a sensor apparatus during such training sessions, it is possible to gather data to train autonomous robots to interact and collaborate with both living subjects and other autonomous robots.

As an example, in one embodiment, the living subject can be an experienced barista at a chain of cafes, and a robot is desired that can perform the basic activities of a human barista. Every workday, the subject wears a sensor apparatus garment during working hours and her activities and surrounding environment are recorded as she actually performs her duties at a real cafe with real human customers. As an example, it is presumed, she has been selected for sensor measurement because she is an expert. She does her job well, knows how to perform all of the day to day tasks, knows where all of the equipment and materials are, knows how to operate and maintain all of the equipment, is able to improvise when necessary, interacts and communicates well with her co-workers, and helps train newer and less experienced co-workers. Her behavior encompasses a relatively narrow and well-defined range of tasks compared to the universe of all possible behaviors that can be exhibited by a typical person, but the day to day work of a barista is nonetheless complex and varied, and requires a significant degree of knowledge, skill, resourcefulness and ability to improvise. She performs her duties in a generally reproducible and consistent way, and deftly deals with unexpected circumstances. The chain of cafes intends to deploy in its cafes one or more robots that exhibit the human barista's skills to the greatest possible extent.

Thus, when the barista wears or adorns the sensor apparatus as illustrated in FIG. 1A, at all times during her work duties, the objective measurements can be gathered and stored by the sensor apparatus. Some or all of its entire surface is covered with a plurality of embedded sensors, constantly detecting how much the suit is flexing, stretching, or being pressed upon at each sensor location at any given moment. In this example, there are also a plurality of accelerometers embedded in key locations of the suit, such as at and between major limb joints or body bending points. Body parts that can rotate can have several accelerometers strategically located so as to detect rotation, tilt, movement, and possibly compass orientation of arms, legs, waist, torso, hands, head, feet, etc. At least one data processing unit of the sensor apparatus can capture the data from each of these sensors periodically (e.g., a plurality of times per second) and stores the results in data files with a time stamp for each predefined time interval.

In this embodiment the sensor apparatus garment also has a headpiece that covers the neck and part of the head in order to capture head and neck movement. It also has accelerometers, video cameras, and microphones mounted on either side (and possibly elsewhere) in order to capture stereophonic audio surrounding the head and stereoscopic video of what is occurring in front of and around the living subject. An audio channel dedicated to capturing mainly the voice of the living subject is also present. In another embodiment, there can be a variety of other detectors on the suit for specialized applications or activities without departing from the scope of the present invention.

Gloves, mitts, or simulated grippers can sense hand movement, orientation, rotation, grasping, etc. They can capture the movement of each finger individually, or they may have fewer pockets or chambers where two or more fingers are enclosed together. The living subject, however, must be able to wear a replica of it on her hands and move it around and use it comfortably in the same way as the robot eventually will. Like the rest of the sensor apparatus, it is also covered in a patchwork of sensors to detect motion, rotation, orientation, bending, grasping force, contact with other objects, and possibly temperature or other data. The exact form, function, and sensor configuration of this hand-piece may vary depending on the tasks being performed without departing from the scope of the present invention. The barista can perform all of her hand manipulations of objects while wearing this hand-piece, and it can serve to capture grasping force and other sensor data at various points on the hand-piece along with detailed motion and orientation data.

The sensor apparatus garment can, in another embodiment, also have sensor-laden leg garments and footwear to detect foot and leg dynamics as well as proximity or contact with other objects, bending, movement, rotation, orientation, and other data to gather information needed to allow the robot to eventually walk and detect objects that come in proximity or contact with its legs and feet.

In one embodiment, the video cameras record everything that occurs in front of her with enough resolution to allow written text to appear clearly if it is in focus by the cameras and is larger than a predetermined size. Having at least two cameras, the stereoscopic recordings also implicitly record data about the barista's spatial environment. These multi-channel video channels encode in great detail the actual physical space the living barista moves around in, the many dynamic objects moving around in it, and the many things that are constantly occurring in it. Since the audio recordings are also stereophonic (or better), they also encode a great deal of implicit spatial data. The video and audio data can be highly correlated with each other, since they are both recording the same objects and events. Both can also be highly correlated with the body motion data and speech, since the body's movement and the barista's speech at any given moment are directly dependent on and determined by the information coming in about the world through the multimedia channels. This high degree of numerical correlation can help the machine-learning process converge towards a reliable system for mapping inputs to outputs.

According to one embodiment, the human subject's line of work, wearing sensor apparatus 100A is that of a professional sensor measurement subject. In the barista example, she first learns the details of working as a barista and acquires a great deal of expertise by actually being a barista. The company that employs her is the robotics company that can build the barista robot. The robotics company has been hired by the chain of cafes to develop such a robot. Part of the contractual agreement between the two firms entails having one or more of the robotics company's professional motion capture subjects trained as baristas, and performing the duties of a real barista at real customer retail cafes providing real products and services to real customers. This project might last months or years, until a robot has been developed that can carry out the duties of the human barista to a level acceptable to the chain of cafes. Some professional subjects might continue the project indefinitely, so that the robotics company can continually refine the behavior of the robot, provide bug fixes, software updates, new features, integrate new practices implemented by the chain of cafes, and for any other ongoing business reasons. These professional sensor measurement subjects can eventually be transferred to other customers of the robotics company. They can learn some other business practice and the process can be repeated. Over the course of their careers, such professional sensor measurement subjects may become experts in a variety of businesses or industries, as well as be skilled, reliable, and productive as professional sensor measurement subjects.

In another embodiment, the human subject is an employee of the client company, and assumes additional duties as a living subject for sensor measurement. In the barista example, the subjects are existing cafe employees selected for their great expertise gained over years of training and experience. These subjects assume the additional duty of having their sensor measurements captured using a sensor apparatus, and are presumably offered additional compensation in exchange.

FIG. 2 illustrates a flow chart of gathering and saving data generated by the sensors of the sensor apparatus, according to one embodiment of the present invention. As illustrated at block 201, the data processing unit of a sensor apparatus detects that a signal is transmitted from at a sensor of the sensor apparatus, the signal generated by the sensor due to a change in a living subject's movement, view, sound, or surrounding environment. As block 203, the data processing unit of the sensor apparatus receives data (objective measurements) transmitted by the sensor. At block 205, the data processing unit, saves the data to a storage medium using a format that can be processed by another computing device using which an autonomous robot can perform substantially in a similar manner to the living subject when the data was generated.

In one embodiment, the data (objective measurement) from each sensor is stored in a time-ordered manner by the data processing unit of the sensor apparatus. Each sensor has a unique and unambiguous label or identifier, and each data point is associated with the time at which it was obtained. Data from each sensor are stored in a track or a channel, each labeled with the particular sensor's unique identifier. The data file is written as a series of time points, each time point containing the data for each track of sensor data corresponding to that labeled time interval. When this file is read from the storage medium, by another processing device, it can be parse into consecutive time intervals of sensor data, as organized within the file. In one embodiment, for illustrative purposes only, the data can be saved in XML format, although any format known to a person of ordinary skill in the art can be used.

As an example, the following snippet of XML represents a schematic snippet of sensor data for a data capture session labeled "barista 25" which took place on Jul. 7, 2015.

```
<session>
    <date>2015-07-07</date>
    <label>barista 25</label>
    <timepoint timestamp="2015-07-07 14:30:25.10">
        <track id="af29c65e" class"accel sensor">
            <location>humerus_left_rear</location>
            <type>lsm303</type>
            <data>
                <x_accel>   192    </x_accel>
                <y_accel>  -1040   </y_accel>
                <z_accel>  -17168  </z_accel>
                <x_magneto> -512   </x_magneto>
                <y_magneto> 27     </y_magneto>
                <z_magneto> 144    </z_magneto>
            </data>
        </track>
        <track id="ee48f62c" class"gyro sensor">
            <location>humerus_left_front</location>
```

-continued

```
            <type>13g</type>
            <data>
                <x_gyro> 188 </x_gyro>
                <y_gyro> -10 </y_gyro>
                <z_gyro> -47 </z_gyro>
            </data>
        </track>
    </timepoint>
    <timepoint timestamp="2015-07-07 14:30:25.20">
        <track id="af29c65e" class"accel sensor">
            <location>humerus_left_rear</location>
            <type>lsm303</type>
            <data>
                <x_accel>   187    </x_accel>
                <y_accel>  -1027   </y_accel>
                <z_accel>  -16834  </z_accel>
                <x_magneto> -565   </x_magneto>
                <y_magneto> 31     </y_magneto>
                <z_magneto> 142    </z_magneto>
            </data>
        </track>
        <track id="ee48f62c" class"gyro sensor">
            <location>humerus_left_front</location>
            <type>13g</type>
            <data>
                <x_gyro> 179 </x_gyro>
                <y_gyro> -13 </y_gyro>
                <z_gyro> -45 </z_gyro>
            </data>
        </track>
    </timepoint>
</session>
```

As shown in the XML snippet, there are two time points, 2015-07-07 14:30:25.10 and 2015-07-07 14:30:25.20. They are consecutive and one tenth of a second apart. Each time point has a set of data tracks enclosed in "track" XML elements. Each track has a unique identifier meaningful primarily to the software that generates or uses the data as well as a class to indicate what kind of device it corresponds to. In the example, each time point has two sensor tracks, "accel sensor" and "gyro sensor." In this example, the "accel sensor" is an ST Microelectronics LSM-303 3 axis accelerometer and compass, the "gyro sensor" is an ST Microelectronics L3D 3 axis digital gyroscope. This information is in the "type" element of each track. This information is useful both for human readability as well as for converting from the raw data units of the sensors to scaled data for storage and machine learning purposes. The sensor data shown are raw, and require post-processing specific to each kind of measurement.

The "data" element can contain one or more pieces of information. The "accel sensor" shown can provide x, y, and z axis measurements of both acceleration and magnetic field, the latter useful for determining the sensor's orientation in the earth's magnetic field. The "gyro sensor" provides measurements of rotational speed around its x, y, and z axes.

FIG. 3 illustrates a block diagram 300 of a sensor apparatus and its components, according to one embodiment of the present invention. As illustrated sensor apparatus 301, in one embodiment, can comprise covering material/garment (not shown) coupled to sensors 303. Sensors 303 are coupled to data processing unit 305 which stores the data generated by the sensors in storage medium 307. In one embodiment, storage medium 307 is a removable device to facilitate ease in transfer to data generated by the sensors 303 of sensor apparatus 301.

FIG. 4 illustrates a block diagram of a sensor apparatus and its components, according to another embodiment of the present invention. In this embodiment, sensor apparatus 301, in addition to sensors 303, data processing unit 305, and covering material (not shown), includes a wireless transceiver 401 that can wirelessly transmit data generated by sensors 303 to an external storage medium 403. In one embodiment, external storage medium is connected to another processing device that can use the stored data as input for the machine learning algorithm described herein.

Figure 5:
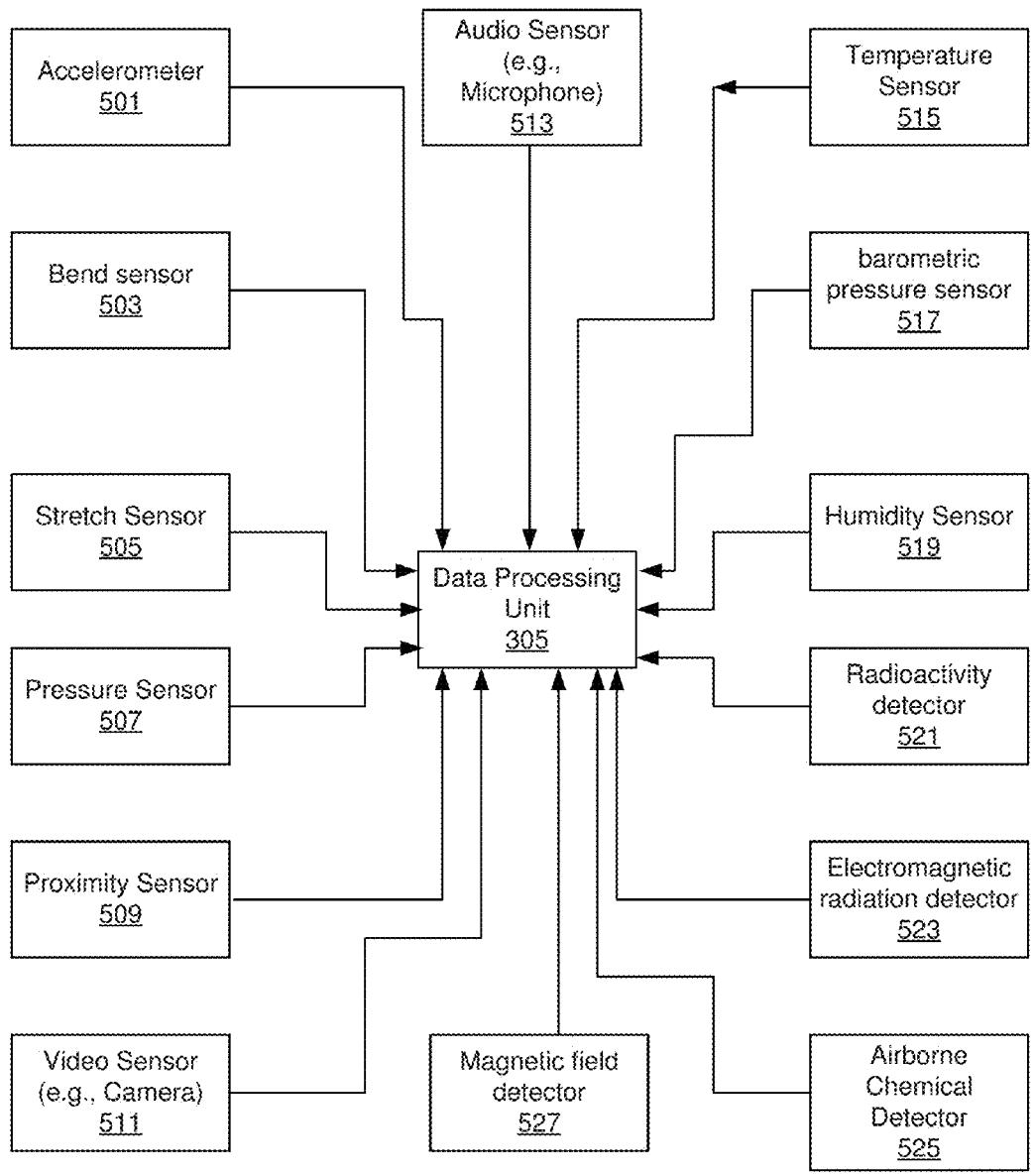
FIG. 5 illustrates a block diagram of the possible sensors connected to a data processing unit of the sensor apparatus, according to an embodiment of the present invention.

FIG. 5 illustrates a block diagram of the possible sensors connected to a data processing unit of the sensor apparatus, according to an embodiment of the present invention.

In one embodiment, sensor apparatus 301 can include any of the following sensors connected or coupled to the data processing unit 305: an accelerometer 501, bend sensor 503, stretch sensor 505, pressure sensor 507 (to measure pressure applied on the covering material where the sensor is located), proximity sensor 509, video sensor 511, audio sensor 513, temperature sensor 515, barometric pressure sensor 517, humidity sensor 519, radioactivity detector 521, electromagnetic radiation detector 523, airborne chemical detector 525, or magnetic field detectors 527. It should be noted, the sensors described herein are not discussed in a restrictive sense, thus, a person of ordinary skill in the art can add other sensors not described herein, as needed.

Figure 6A:
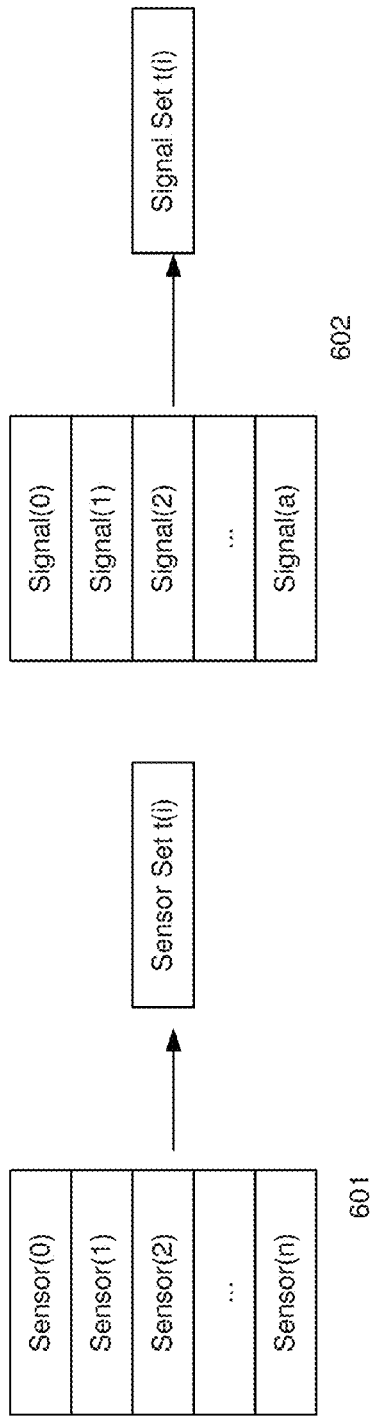
FIG. 6A illustrates a diagram depicting the organization of the data captured from living subjects, according to one embodiment of the present invention.

FIG. 6A illustrates a diagram depicting the organization of the data captured from living subjects, according to one embodiment of the present invention. FIG. 6A illustrates the organization of the data captured from living subjects and how it is used to process the data using a machine-learning computer program/algorithm. In FIG. 6A, at any given time interval i, the sensor apparatus yields s sensor readings, where s is the total number of sensors, audio and video capture devices, etc. comprising the sensor apparatus. All of the data from the sensor apparatus at time interval i t(i) can be represented by sensor set t(i), 601. Likewise, all of the number a robot motion control and audio generating signals needed for the robot to perform all of its operations during a given time interval i can be represented by signal set t(i), 602.

Figure 6B:
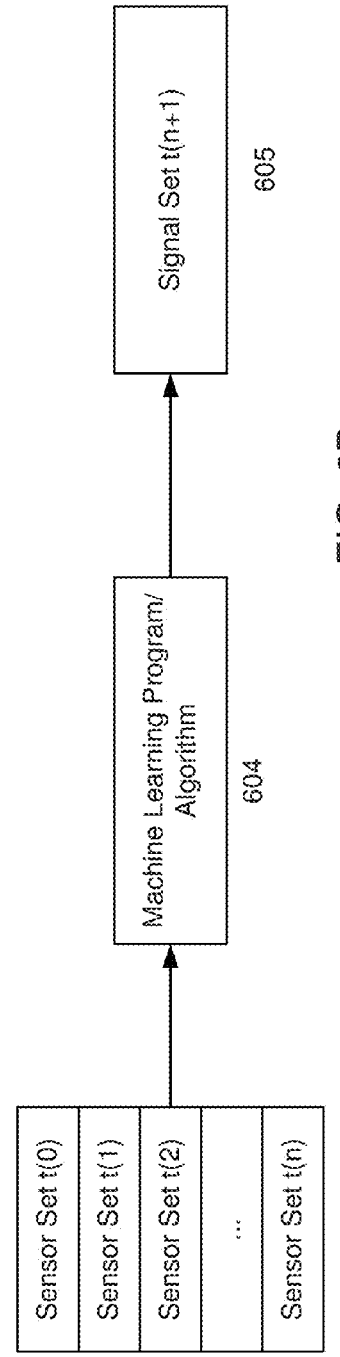
FIG. 6B illustrates a diagram depicting the processing by the captured data by a machine learning algorithm to be used by an autonomous robot.

FIG. 6B illustrates a diagram depicting the processing by the captured data by a machine learning algorithm to be used by an autonomous robot. In FIG. 6B, the robotic device's machine-learning program 604 receives as input a full set of sensor apparatus data 603 for each of the last n consecutive contiguous time intervals, where t(n) is the last most recent time interval for which sensor data are available. It outputs the set of a signals 605 needed to actuate all of the number a of the robot's motion generating signals and communications outputs during the next single time interval, time interval n+1, t(n+1).

Figure 7:
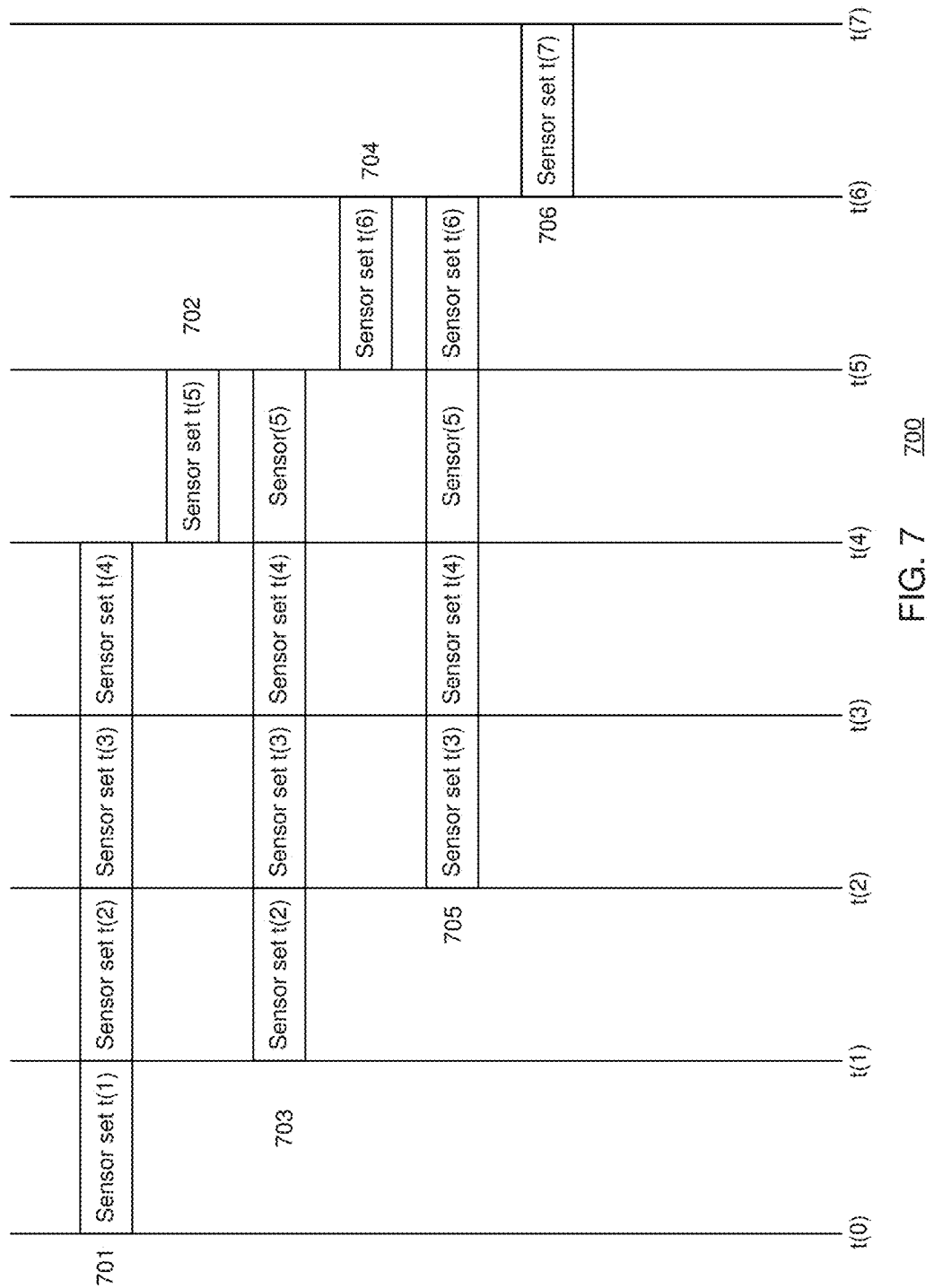
FIG. 7 illustrates a diagram of data that can be input to and output from the machine learning program or algorithm on consecutive time intervals, according to one embodiment of the present invention.

FIG. 7 illustrates a diagram of data that can be input to and output from the machine learning program or algorithm on consecutive time intervals, according to one embodiment of the present invention. After the first n consecutive contiguous time intervals of sensor data have been accumulated, the machine-learning program can compute the first time interval's worth of robot control signals. Control signals can be computed to move the robot (by controlling the robot's motors, actuators, etc.) to behave in a substantially similar manner as the living subject using which the sensor data was generated. In this schematic example, n=4. Therefore, after the sensor data has accumulated over 4 time intervals 701, they are used to compute the control signals for time interval 5, signal set t(5) 702. This signal set is sent to the robot's motion control and audio generating mechanisms to execute its activities during time interval t(5), as well as to the robot's data storage mechanism.

In FIG. 7, after time interval 5 t(5) has elapsed, a new time interval's worth of sensor data has been accumulated, sensor set t(5), which reflects the movement of the robot as well as the new video, audio, and other data captured from the environment over that time interval. The sensor data from the first time interval t(1) are now more than n=4 time intervals away in the past, so they are discarded from the inputs to the machine-learning program, although they are still saved in the sensor apparatus's data storage mechanism. Now only the 4 time intervals t(2) through t(5) are used to compute the control signals for the next time interval, t(6) 704.

In FIG. 7, another time interval has elapsed and another set of sensor data has been accumulated, sensor set t(6), 704. Now the oldest previous set of sensor data is discarded, and the sensor data from time intervals t(3) through t(6) 705 are used to compute the next time interval of control signals, signal set t(7) 706.

This process can be done continuously during the entire time the robot is in operation. In the example, for illustrative purposes only, the number of time intervals used to calculate each time interval's worth of robot control signals is 4. In practice, this is likely to be substantially more. It may be necessary to use tens, hundreds, thousands, or even more time intervals to compute each succeeding time interval's worth of robot control signals.

The number of time intervals per second needed to achieve smooth and acceptable operation can also vary according to specific applications and can depend on the computing and communications capabilities of the materials and devices used to construct the robot, as well as the number, type, location and organization of the sensors in the sensor apparatus, without departing from the scope of the present invention.

In an embodiment, the data from the sensor apparatus can be used as inputs for the machine-learning program, which can in turn generate the control signal data that can be used to drive the robot's motion generating mechanisms. For this to be possible, the machine-learning program must already be at least minimally trained with a significant repository of input and output training examples that cover its full range of movement and audio generation. A bootstrapping data set must be created for this purpose before sensor measurement data from living subjects can be used.

To generate an initial data set, the robot is driven directly over the entire practical range of motion of its mechanical components, and its movements are captured with the sensor apparatus that comprises its outer covering. This is achieved by developing a set of software tools that can produce the encoded control signals that can cause the robot to move in ways that roughly cover the ranges of motion and audio generation that can be performed during normal operation. The robot can be made to stand and sit, to walk, to move its limbs, to open and shut its hands, to grasp and manipulate objects, to emit vocalizations, and any other combinations of movements that the robot builders can conceive. In at least one embodiment a video game-like interface can be used to have a human operator drive the robot and perform correct movements based on the video and audio data coming in from the sensor apparatus, such as pointing the head at a person who is speaking or performing tasks with its arms and hands. In other embodiments it can be scripted or otherwise partially or completely predefined. These motions do not necessarily need to be accurate imitations of human gait or other natural movements. They only need to move the robot's body, limbs, extremities, grippers, etc. through the same ranges of motion that can be found in the sensor measurement sessions with the living subject. For example, the software can raise and lower arms at different speeds and bend them to different degrees over the same natural range that a human arm would perform those movements, even if the movements don't really look natural. The object is to drive the robot through those motions and have its sensor apparatus generate a corresponding data set. That can produce the inputs for the machine-learning algorithm, as well as their correct corresponding outputs.

In one embodiment, the software tools produce robot motion control and audio generating signals can be generated simultaneously while the sensor apparatus gathers data from its sensors, and the time stamp for that interval is the same for both the sensor data and the robot control signal data. This means that they are synchronized in time with each other, and that stored sensor data and control signals can be retrieved from their respective computer data storage systems to compile training examples as described herein.

In one embodiment, such time-synchronized data can be conveniently stored by means of, but not limited to, the ISO Base Media File Format and the subsequent MP4 file format (ISO/IEC 14496-12:2003(E), and ISO/IEC 14496-12:2005, respectively) developed by the Moving Picture Experts Group (MPEG) of the International Organization for Standardization (ISO) and the International Electrotechnical Commission (IEC). The object-based design of these file formats defines a set of data layout standards that govern the binary coded representation of individual audiovisual objects, text, graphics, and other digital objects and is described in detailed discussing FIG. 9. These formats organize audiovisual streaming data into tracks, chapters, and samples, among other things, with time markers placed in such a way that the audiovisual content can be streamed and displayed in the proper temporal order. The standard provides for storing subtitles, additional language soundtracks, commentary tracks, and in effect any kind of text or binary data that needs to be divided into temporal segments in synchronization with the other tracks encoded in the file. There is ample provision specified to store detailed metadata describing every piece of information stored in the file. While this standard does not explicitly contemplate the storage of machine-learning training data, it can be recruited to do so in a straightforward manner. Each sensor in the sensor apparatus and each robot control and audio generating mechanism is assigned to its own unambiguously labeled track within the file, and means provided by the standard are used to ensure that the data are stored in a time-synchronized manner. When the time comes to create the supervised learning training examples by parsing the time-synchronized data files, the consecutive contiguous time intervals can be extracted from the files as needed and the training examples constructed as shown in FIGS. 6 and 7.

The machine-learning mechanism is initially trained with the input and output examples generated via the robot driving process. Once the machine-learning program has undergone some amount of training, if sensor apparatus data from the living subject are used as inputs, the machine-learning algorithm can use the internal representation resulting from that training to generate robot motion signals that can make the robot perform the corresponding movements and vocalizations. With an extensively trained machine-learning program, these behaviors can closely resemble those of the living subject. After only preliminary training, however, they can be approximate and flawed since the machine-learning program's internal representation is still crude and approximate.

In one embodiment of the method, the living subject can first have to perform very simple tasks to produce sensor measurements. Some of those tasks can be variations of the same movements and vocalizations that are generated by the robot driving software tools. As in the robot driving sessions, the living subject can perform them over and over, thereby incorporating the many major and minor variations that are inevitable in the behaviors of living beings. She would also perform gradually more extensive variations of those tasks in order to enrich the training data set with training examples similar to the ones generated by the robot driving software but with an increasingly significant amount of variation.

In an iterative process, the machine-learning program can be trained with batches of training examples derived from the robot driving sessions. Sensor data from living subjects can then be supplied to the robot's machine-learning program, robot control signals can be produced and stored, and the robot's resulting movements and vocalizations can generate test sensor data. Both the robot control signals and the robot's resulting sensor data can be curated by editing, manual or software-assisted correcting or smoothing, or otherwise altering them for use as improved training examples. The machine-learning program is further trained with these altered training examples, and the process can be repeated.

At any time in this process, training data that are deemed to be too flawed for continued use are removed from the repository. Also, at any time the machine-learning program instance being trained can be abandoned, and a new one trained using the curated training data, and used thereafter for further training. In this way, one or more constantly improving machine-learning program instances can be in preparation at any given time. Eventually, the internal representation of one or more such instances can stabilize enough for the robot to acceptably emulate a range of behaviors, if only in the narrow range represented in the training example repository.

The computer files corresponding to the machine-learning program's internal representations can be accumulated in much the same way improved software releases are accumulated by software developers. These files are installable in a robot machine-learning program in such a way that they fully replace the program's existing internal representation. In this way the training process need only occur on one or a few training systems, and the resulting trained internal representations distributed to any number of actual autonomous robots as needed to correct defects or add new capabilities.

Figure 8:
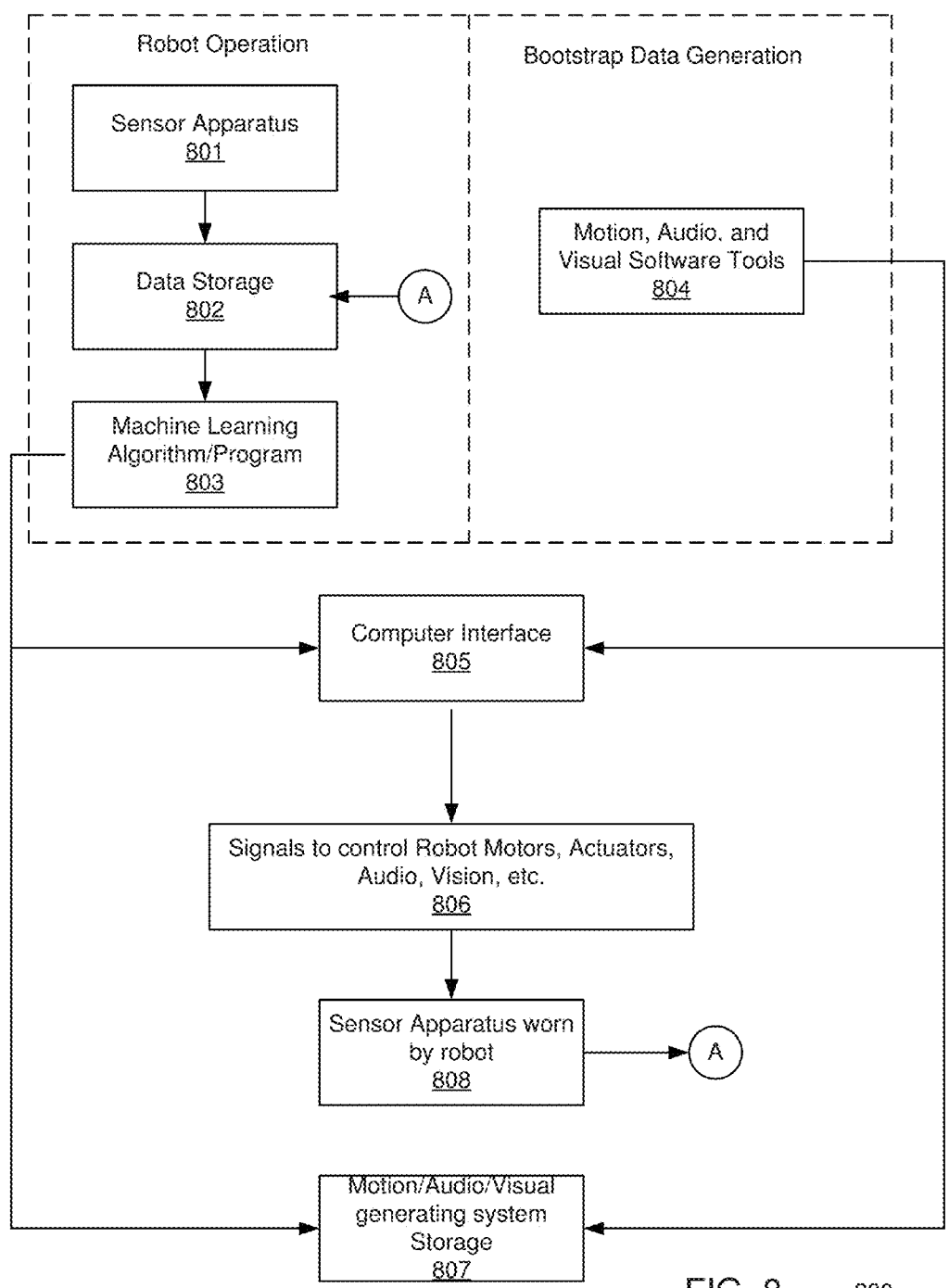
FIG. 8 illustrates a diagram of flow of sensor and control signal data, according to one embodiment of the present invention.

FIG. 8 illustrates a diagram 800 of flow of sensor and control signal data to train/control an autonomous robot behaving in a substantially similar manner like the living subject while the data was generated, according to one embodiment of the present invention. The data generated from the sensor apparatus 801 are fed into a machine-learning program/algorithm 803 from data storage 802. The machine-learning program 803 produces as its outputs a set of data that encodes the signals needed to generate the next time interval of robot motion and audio. The sensor apparatus 801 generates data that are stored in the sensor apparatus data storage system 802. As indicated in FIG. 7, previous sensor data sets and signal sets from the past (generated by the sensor apparatus) must already be present to make use of the machine-learning program. Once such a set of is available, the data is stored in the sensor apparatus's data storage 802, and from there the data can be presented to the machine-learning program to assemble the consecutive contiguous time intervals of sensor data that serve as its input. The machine-learning program produces outputs that encode the signals 806 to be sent to the robot's motion control and audio generating mechanisms, via computer interface 805. Computer interface, in one embodiment, is a data processing device, that can convert the encoded motion and audio data into the proper electrical signals that can cause the robot's motion and audio generating systems to execute their activities and therefore robot motion and audio vocalizations can be produced. In one embodiment, the robot control signals are also stored to a the motion and audio generating system data storage 807, so that the data can be reused (or refined), as needed. After training and during everyday operation, the robot can behave very much like the subject did in the setting where the behavior capture sessions were carried out. The robot moves around the setting and performs the same sorts of tasks in it as did the living subject during the behavior capture sessions, and responds to actions and events in a similar way. In the case of behavior recorded from human subjects and after the machine-learning program has been trained to a sufficient degree, the robot can be able to speak and understand spoken speech similar to that which occurred most frequently in the behavior capture sessions.

In an alternative embodiment, to result in autonomous operation of the robot, the robot motion control and audio generating signals can be generated via a bootstrap data generation mechanism. In this embodiment, instead of using the machine learning program, a suite of motion, audio, and visual software tools 804 are used. The suite of computer software tools 804 can be used to generate such signals based on heuristics, formulas, manual operation by one or more human operators, use of interactive software tools by one or more human operators, edited or curated data from living subjects, edited or curated data from previous attempts at training the machine-learning program, or any other arbitrary strategies or criteria known to those skilled in the art, or any combination thereof, in order to cause the robot to produce motion and sound. This can be done for the initial training of a new, untrained machine-learning program instance. The software tools 804 generate the desired encoded motion and audio data; the generated data can be processed directly by computer interface 805 that converts the encoded motion and audio data into the proper electrical signals 806 that can cause the robot's motion and audio generating systems to execute their activities and therefore robot motion and audio vocalizations can be produced. The encoded motion and audio data can then be stored in the motion and audio generating system data storage mechanism.

In one embodiment, the computer interface 805 that converts the encoded motion and audio data into proper electrical signals 806 is a part of the robot itself. At any given time, only one of the two alternative signal generation methods described above can be used to drive the robot. Either the robot is operating autonomously under the control of the machine-learning program, or it is being driven directly by means of the software tools, however, not both at once.

In one embodiment, the robot can be adorned with the sensor apparatus 808 while it is performing the actions governed by either the machine learning algorithm 803, or the suite of motion, audio, and visual software tools 804. Once the data generated by sensor apparatus 808 worn by the autonomous robot is generated and stored in data storage 802, the process can be repeated, and a new signal set can be created with the newly generated data.

Thus, an identical sensor apparatus 808 adorned/worn by a user illustrated in FIGS. 1A & 1B, can be worn by an autonomous robot to generate data, while being controlled by computer interface 805. In this case, with the exception of the exposed areas of the living subject not covered by the sensor apparatus, the living subject wearing the sensor apparatus and the corresponding robot would be visually indistinguishable to a casual observer. This is because, to operate in a substantially similar manner like the living subject, the robot design would be required to have the same shape and degrees of freedom in its trunk, limbs, and other major body parts as the living subject. The degrees of freedom of the robot's hand and finger motion can be equal to or less than that of the corresponding living subject if the robot's grippers are different in form from a human hand. In such a case the living subject can wear sensor-laden mock-ups of the grippers to provide the requisite sensor data during sensor measurement capture sessions.

In one embodiment, the robot control signals, to control an autonomous robot, are stored in the same way as consecutive time intervals of data tracks. Each motor, actuator, audio device, or other controllable robotic element has its own track or channel with a unique and unambiguous identifier. The signals are written to the file as they are generated and used, in the same manner as the sensor data. Eventually, when there are both signal data and robot control data for the same data capture session, the two can be merged into the same file for both long term storage and for convenient generation of training examples. Such a file can contain both input and output data for the supervised learning algorithm, easily retrievable as consecutive time intervals of complete data sets.

Thus, referring back to the schematic snippet for a data capture session labeled "barista 25" which took place on Jul. 7, 2015, the sensor and control data can, in one embodiment, be represented as the following:

```
<session>
    <date>2015-07-07</date>
    <label>barista 25</label>
    <timepoint timestamp="2015-07-07 14:30:25.10">
        <track id="af29c65e" class"accel sensor">
            <location>humerus_left_rear</location>
            <type>lsm303</type>
            <data>
                <x_accel>   192     </x_accel>
                <y_accel>  -1040    </y_accel>
                <z_accel>  -17168   </z_accel>
                <x_magneto> -512    </x_magneto>
                <y_magneto> 27      </y_magneto>
                <z_magneto> 144     </z_magneto>
            </data>
        </track>
        <track id="ee48f62c" class"gyro sensor">
            <location>humerus_left_front</location>
            <type>l3g</type>
            <data>
                <x_gyro> 188 </x_gyro>
                <y_gyro> -10 </y_gyro>
                <z_gyro> -47 </z_gyro>
            </data>
        </track>
        <track id="94eb27a1" class"stepper motor">
            <location>deltoid_left</location>
            <type>42STH34-1004A</type>
            <data>
                <rpm>33</rpm>
            </data>
        </track>
        <track id="48d5ec7b" class"stepper motor">
            <location>tricep_left</location>
            <type>42STH34-1004A</type>
```

```
        <data>
            <rpm>-17</rpm>
        </data>
    </track>
</timepoint>
<timepoint timestamp="2015-07-07 14:30:25.20">
    <track id="af29c65e" class"accel sensor">
        <location>humerus_left_rear</location>
        <type>lsm303</type>
        <data>
            <x_accel>   187     </x_accel>
            <y_accel>  -1027    </y_accel>
            <z_accel>  -16834   </z_accel>
            <x_magneto> -565    </x_magneto>
            <y_magneto> 31      </y_magneto>
            <z_magneto> 142     </z_magneto>
        </data>
    </track>
    <track id="ee48f62c" class"gyro sensor">
        <location>humerus_left_front</location>
        <type>l3g</type>
        <data>
            <x_gyro> 179 </x_gyro>
            <y_gyro> -13 </y_gyro>
            <z_gyro> -45 </z_gyro>
        </data>
    </track>
    <track id="94eb27a1" class"stepper motor">
        <location>deltoid_left</location>
        <type>42STH34-1004A</type>
        <data>
            <rpm>29</rpm>
        </data>
    </track>
    <track id="48d5ec7b" class"stepper motor">
        <location>tricep_left</location>
        <type>42STH34-1004A</type>
        <data>
            <rpm>-14</rpm>
        </data>
    </track>
</timepoint>
</session>
```

Thus, the complete XML schematic representation can disclose each time point with the two sensor tracks, "accel sensor" and "gyro sensor," as well as two control signal tracks, both of class "stepper motor." Each stepper motor controls the movement of the robot based on the data collected from the "accel sensor" and the "gyro sensor." It is up to the software to determine which is sensor data and which is control signal data based on these class names. As discussed herein, the "stepper motors" are Intec 42 mm 42STH34-1004A stepper motors. The stepper motors shown only need one piece of data, the rpm rate at which they should spin during the next tenth of a second. A positive value means spin in the forward direction, whereas a negative value indicates spinning in the reverse direction.

In one embodiment, an autonomous robot described herein can be driven by motion generating mechanisms such as, but not limited to, any kind of electric motor, pneumatic or hydraulic system, internal combustion motor, pulleys, chains, cables, motorized linear actuators, moving pistons, or any kind of mechanism capable of producing mechanical movements as described herein. The required form and shape of the robot, as well as changes therein suitable for mimicking such forms, shapes, and changes found in living subjects, can be achieved by means such as, but not limited to, any of these motion generating mechanisms individually or in combination, possibly encased in rigid or flexible materials known to those skilled in the robotic and animatronic arts. Robots making use of any of these components can be used without departing from the scope of the present invention.

In another embodiment, the behavior of a living subject can be captured with a sensor apparatus garment on a daily basis for an open-ended period of time as part of the living subject's regular job activities. Periodic digests or releases of the sensor data can be created and archived for use in training robots with versioned and possibly curated data. As recording sessions are accumulated, unit tasks such as taking an order, fulfilling it or having it fulfilled, and successfully charging the customer can have been captured thousands of times. The sensor apparatus data can contain numerous variations of each one. The diverse yet generally consistent dynamics of movement and vocalizations associated with them can be represented implicitly in the growing library of sensor apparatus data files. The many often subtle but more or less stereotyped variants encode the human subject's ability to generate appropriate body movements and vocalizations based on the barrage of sensor apparatus data coming in at every moment and to improvise in an acceptable manner when necessary.

The robot can be running a machine-learning program that can generate the next moment's movements and speech using sensor apparatus data from the most recent predetermined time span. A common way to perform such a mapping is to use a machine-learning algorithm that can be trained to associate the recent sensor apparatus data to the data for the next moment's robot control signals. There is a variety of choices involving supervised learning. Supervised learning consists of providing a machine-learning algorithm with a large repository of known training examples. In each example there is a list of numbers that constitute the input example, and another that constitutes a known correct output example. Specific algorithms vary, but in general these training examples are repeatedly supplied to the algorithm until it has "learned" them, which in practice means that when presented with one of the input examples it can correctly produce an accurate approximation of the corresponding output example. It can not always produce the exact outputs present in the training examples because the machine-learning process usually involves error reduction strategies that minimize but do not entirely eliminate noise in the data or in the algorithm's internal representation of the data. Usually the learning process is repeated iteratively until the error converges to an arbitrary level of acceptability, not to absolute correctness. Further training can also occur with new training examples. Such methods and practices are known to those with skill in the artificial intelligence and machine-learning arts.

For the purposes of an autonomous robot, a "good enough" approximation can be adequate in which the actual movements and vocalizations of the autonomous robot match those of the living subject to an arbitrarily acceptable degree. Also, during normal operation of the robot the inputs received from the sensor apparatus can rarely if ever be exactly the same as any in the training examples. They can be similar, but not the same. The machine-learning algorithm can generate a best guess approximation of the outputs that is consistent with its prior supervised learning. This, too, should be good enough if the training example repository has been rich and extensive enough and the robot's operating environment closely matches the environments represented in the repository. Hence an open-ended duration of sensor apparatus measurement sessions, even after the autonomous robot's performance has been deemed acceptable enough for it to be deployed and already operating in the field. As with most computer software, corrections and updates can be made available through time as needed.

As data sets are trained into the robot's machine-learning program over time, its ability to operate continuously and autonomously can increase. With a suitably large and varied training example repository derived from one or more living subjects, and with enough iterations of the processes described above, the goal of continuous unsupervised operation of the autonomous robot can be achieved. Given sufficiently powerful hardware, it is likely that some semblance of intelligent and articulate use of language, proficiency in the physical skills represented in the training sets, and practical problem solving strategies can emerge in the robot.

In the course of normal day to day operation, the autonomous robot can continue to store both its sensor apparatus data as well as the signals generated for movement and speech. Training examples for further training into its internal representation can be derived from these everyday experiences, thus allowing some sort of ongoing learning from its own experience. These training examples can also be used to train other machine-learning program instances in other autonomous robots, thereby sharing such learning across multiple autonomous robots.

The preceding descriptions contain a number of specificities, but these should not be construed as limitations of scope, but rather as examples of several possible embodiments. For example, many other variations are possible, such as training robots with data derived from human experts skilled at such diverse activities as elder care, nursing, housemaids, general retail and food service tasks, information kiosk attendants, receptionists, security and surveillance, working in hazardous environments inhospitable to humans, agriculture, pet care, and tour guides, to name a few. The behavior of close friends and relatives can be captured on an ongoing basis for a period of time and that behavior can be reproduced in their absence by trained robots. Individuals who live alone can use trained robots for companionship and loneliness mitigation when they are unable or unwilling to be in the company of their fellows. By using highly trained animals as living subjects, specialized service robots, robotic beasts of burden, surveillance and exploration robots, and other specialized autonomous robots can also be developed and distributed in size and shape formats different from their humanoid counterparts.

The embodiments as described herein can serve as general purpose training platforms to develop autonomous robots that can express lifelike behaviors. Given sufficient training with a large and varied enough training example repository a wide variety of robotic applications become available. Since autonomous operation is central to this method, the robots can be deployed to the field with a high degree of flexibility. An expanding market of opportunities for proficient animal trainers and highly skilled professional sensor measurement subjects can gradually appear to provide training data for specialized robots.

Training individual machine-learning program instances with training data obtained from numerous living subjects, particularly living subjects that have acquired great knowledge and expertise in specific realms of knowledge or endeavor, who are skilled at using such expertise in the creation of new products, services or intellectual property, and who are skilled at providing advice and assistance to others in need of such specialized expertise can cause the machine-learning program to gradually express knowledge and expertise that for practical purposes is equal to or greater than that of any single living subject that contributed to its training example repository. Such a machine-learning program instance constitutes an artificial general intelligence. It is of practical utility for that instance to be reproducible in an unlimited number of autonomous robots.

Figure 9:
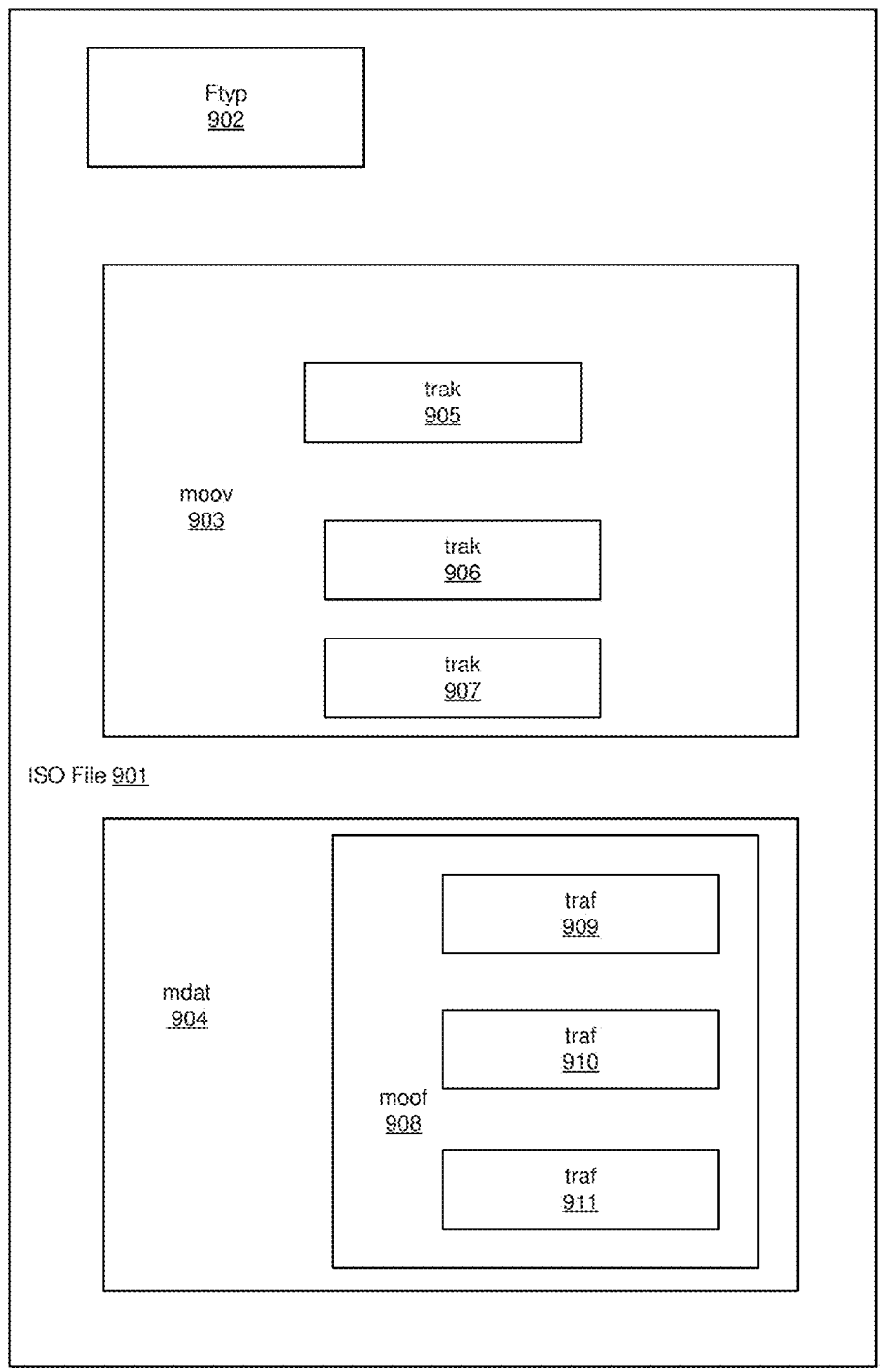
FIG. 9 illustrates a diagram of the top-level elements of an ISO base file format that can be used to store time marked sensor and robot control signal data conveniently in a single computer data file, according to an embodiment of the present invention.

FIG. 9 illustrates a diagram of the top-level elements of an ISO base file format that can be used to store time marked sensor and robot control signal data conveniently in a single computer data file, according to an embodiment of the present invention. In one embodiment, the data file storing the data and control signals can be an ISO file 901 containing an flyp section 902 encoding a file type, a moov section 903 which holds elements encoding meta-data for the data being stored, and an mdat section 904 which holds the actual digital data. The moov section 903 has one or more trak sections 905, 906, and 907, each storing meta-data for a separate and distinct track of temporal data. In an audiovisual data file each of these would hold meta-data for the audio, video, and commentary tracks, respectively, for example. The mdat section 904 has a moof section 908 which in turn holds one or more traf sections 909, 910, and 911, each storing the actual data for a separate and distinct track of temporal data. In an audiovisual data file each of these would hold the binary data for the audio, video, and commentary tracks, respectively, for example. The traf and trak sections are labeled within the file in such a way that they can be easily and correctly associated with each other. The diagram in FIG. 9 is a very high level description of the file format, which provides far more means for storing and processing data and is intended for illustrative purposes only. The data for each specific sensor and each specific robot motion control and audio generating signal channel can be stored in their own specific trak and traf sections. The file format standard provides sufficient means for keeping all of the data separate and synchronized in time in the traf data sections, as well as fully labeled and documented in the trak meta-data sections.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention.

Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art can recognize what is meant by such expressions is that the functions result from execution of the code by a processor.

FIG. 10 is a block diagram illustrating a data processing system such as a computing system 1000 which may be used with one embodiment of the invention. For example, system 1000 may be implemented as part of a sensor apparatus, device for a machine learning algorithm/program, or an autonomous robot. In one embodiment, system 1000 may be part of a system implemented using innovative techniques described herein. System 1000 may have a distributed architecture having dispersed units coupled through a network, or all of its components may be integrated into a single unit.

For example, computing system 1000 may represents any of data processing systems described above performing any of the processes or methods described above. System 1000 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1000 is intended to show a high level view of many components of the computer system. However, it is to be understood that additional or fewer components may be present in certain implementations and furthermore, different arrangement of the components shown may occur in other implementations. System 1000 may represent a desktop, a laptop, a tablet, a server, a mobile phone, a programmable logic controller, a personal digital assistant (PDA), a personal communicator, a network router or hub, a wireless access point (AP) or repeater, a set-top box, an embedded computer, a general-purpose computer on graphics processing units (GPGPU), or a combination thereof.

In one embodiment, system 1000 includes processor 1001, memory 1003, and devices 1005-1008 via a bus or an interconnect 1022. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1001, which may be a low power multi-core processor socket such as an ultra low voltage processor, may act as a main processing unit and central hub for communication with the various components of the system. Such processor can be implemented as a system on chip (SoC). In one embodiment, processor 1001 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1001 is configured to execute instructions for performing the operations and methods discussed herein. System 1000 further includes a graphics interface that communicates with graphics subsystem 1004, which may include a display controller and/or a display device.

Processor 1001 may communicate with memory 1003, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 207-2E (published April 2007), or a next generation LPDDR standard to be referred to as LPDDR3 that can offer extensions to LPDDR2 to increase bandwidth. As examples, 2/4/8 gigabytes (GB) of system memory may be present and can be coupled to processor 1001 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1003 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1003 may store information including sequences of executable program instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1000 may further include IO devices such as devices 1005-1008, including wireless transceiver(s) 1005, input device(s) 1006, audio 10 device(s) 1007, and other IO devices 1008. Wireless transceiver 1005 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 1007 may include a speaker and/or a microphone to facilitate voice-enabled functions, such as voice recognition, voice replication, digital recording, and/or telephony functions. Other optional devices 1008 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1008 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1007 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1001, e.g., via a serial peripheral interface (SPI). This flash device may provide for non-volatile storage of system software, including a basic input/output software (BIOS) as well as other firmware of the system.

Note that while system 1000 is illustrated with various components of a data processing system, it is not intended to represent any particular architecture or manner of interconnecting the components; as such details are not germane to embodiments of the present invention. It can also be appreciated that network computers, handheld computers, mobile phones, and other data processing systems which have fewer components or perhaps more components may also be used with embodiments of the invention.

Thus, methods, apparatuses, and computer readable medium to train an autonomous robot using a sensor apparatus are described herein. Although the present invention has been described with reference to specific exemplary embodiments, it can be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A sensor apparatus for periodically gathering data from a living subject for use by an autonomous robot, the sensor apparatus comprising:
   a covering material configured to cover at least a portion of the living subject, wherein the covering material includes a garment covering the entire body of the living subject, headgear, footwear, and gloves;
   one or more first sensors coupled to the covering material, wherein the one or more first sensors are at least one of an accelerometer, bend sensor, stretch sensor, pressure sensor, or proximity sensor, wherein the one or more first sensors can measure movements, bending, rotations, or angular displacement of the entire body of the living subject including arms, legs, joints, and extremities of the living subject in a controlled environment; and
   a data computing device connected to the one or more sensors, wherein the data computing device can periodically capture and save the data generated from the one or more first sensors in a data file on a storage medium, wherein the data can be retrieved from the storage medium and processed by another computing device for use by an autonomous robot in a manner such that the autonomous robot exhibits substantially the same movement or action, as exhibited by the living subject when the data was being captured, and wherein the another computing device can generate robot control signals for smooth operation performed by the autonomous robot, the another computing device configured to:
   process a first set of n consecutive time intervals of sensor data to compute a first time interval of robot control signals, wherein the first set of n consecutive time intervals of sensor data includes sensor data of i to n consecutive time intervals, and
   process a second set of n consecutive time intervals of sensor data to compute a second time interval of robot control signals, wherein the second set of n consecutive time intervals of sensor data includes sensor data of i+1 to n+1 consecutive time intervals,
   wherein i and n represent first and last consecutive time intervals, respectively, of the first set of n consecutive time intervals, and wherein i+1 and n+1 represent first and last consecutive time intervals, respectively, of the second set of n consecutive time intervals.

2. The sensor apparatus of claim 1, wherein the data generated by the first sensors include measurements of motions, movements, change in posture, change in position, of the living subject or the immediate environment of the living subject, in the controlled environment.

3. The sensor apparatus of claim 1, further comprising:
   one or more second sensors coupled to the covering material, wherein the one or more second sensors are video cameras that can provide a plurality of views of the surroundings around the living subject in the controlled environment.

4. The sensor apparatus of claim 3, wherein the data generated by the one or more second sensors includes data related to gestures, grasping, gait, or other bodily dynamics and multi-media recordings of the living subject and the immediate environment of the living subject.

5. The sensor apparatus of claim 1, further comprising:
   one or more third sensors coupled to the covering material, wherein the one or more third sensors can capture auditory sounds signals transmitted from or around the living subject in the controlled environment, and wherein the data generated by the one or more third sensors includes data related to vocalizations of the living subject and the immediate environment of the living subject.

6. The sensor apparatus of claim 1, further comprising:
one or more fourth sensors coupled to the covering material, wherein the one or more fourth sensors are at least one of a temperature sensor, humidity sensor, barometric pressure sensor, radioactivity detector, magnetic field detector, electromagnetic radiation detector, or airborne chemical detectors from or around the living subject in the controlled environment, and wherein the data generated by the one or more fourth sensors includes data related to the environment around the living subject.

7. The sensor apparatus of claim 1, wherein, the data computing device, at each periodic capture of data, uniquely tags the data generated from the one or more sensors with an identification code, each tag identifying the sensor from which the data was generated.

8. The sensor apparatus of claim 7, wherein the data generated at each periodic capture is saved in a track or channel in the data file.

9. A method for periodically gathering data from a living subject using a sensor apparatus to be used by an autonomous robot, the method comprising:
detecting, by a data computing device of the sensor apparatus, a signal transmitted by one or more first sensors of the sensor apparatus, wherein the one or more first sensors are coupled to a covering material of the sensor apparatus, the covering material configured to cover at least a portion of the living subject, wherein the covering material includes a garment covering the entire body of the living subject, headgear, footwear, and gloves;
based on the detection, receiving data from the one or more first sensors, wherein the one or more first sensors are at least one of an accelerometer, bend sensor, stretch sensor, pressure sensor, or proximity sensor, and wherein the one or more first sensors can measure movements, bending, rotations, or angular displacement of the entire body of the living subject including arms, legs, joints, and extremities of the living subject in a controlled environment; and
storing the data generated by the one or more first sensors, wherein the data computing device can periodically capture and save the data generated from the one or more first sensors in a data file on a storage medium, wherein the data can be retrieved from the storage medium and processed by another computing device for use by an autonomous robot in a manner such that the autonomous robot exhibits substantially the same movement or action exhibited by the living subject when the data was being captured, and wherein the another computing device can generate robot control signals for generating smooth operations performed by the autonomous robot by:
processing a first set of n consecutive time intervals of sensor data to compute a first time interval of robot control signals, wherein the first set of n consecutive time intervals of sensor data includes sensor data of i to n consecutive time intervals, and
processing a second set of n consecutive time intervals of sensor data to compute a second time interval of robot control signals, wherein the second set of n consecutive time intervals of sensor data includes sensor data of i+1 to n+1 consecutive time intervals,
wherein i and n represent first and last consecutive time intervals, respectively, of the first set of n consecutive time intervals, and wherein i+1 and n+1 represent first and last consecutive time intervals, respectively, of the second set of n consecutive time intervals.

10. The method of claim 9, wherein the data generated by the one or more first sensors include measurements of motions, movements, change in posture, change in position, of the living subject or the immediate environment of the living subject, in the controlled environment.

11. The method of claim 9, further comprising:
receiving data from the one or more second sensors, wherein the one or more second sensors are video cameras that can provide a plurality of views of the surroundings around the living subject in the controlled environment, and wherein the data generated by the one or more second sensors includes data related to gestures, grasping, gait, or other bodily dynamics and multi-media recordings of the living subject and the immediate environment of the living subject.

12. The method of claim 9, further comprising:
receiving data from one or more third sensors coupled to the covering material, wherein the one or more third sensors can capture auditory sounds signals transmitted from or around the living subject in the controlled environment, and wherein the data generated by the one or more third sensors includes data related to vocalizations of the living subject and the immediate environment of the living subject.

13. The method of claim 9, further comprising:
receiving data from one or more fourth sensors coupled to the covering material, wherein the one or more fourth sensors are at least one of a temperature sensor, humidity sensor, barometric pressure sensor, radioactivity detector, magnetic field detector, electromagnetic radiation detector, or airborne chemical detectors from or around the living subject in the controlled environment, and wherein the data generated by the one or more fourth sensors includes data related to the environment around the living subject.

14. The method of claim 9, wherein, the data computing device, at each periodic capture of data, uniquely tags the data generated from the one or more first sensors with an identification code, each tag identifying the sensor from which the data was generated, and wherein the data generated at each periodic capture is saved in a track or channel in the data file.

15. A non-transitory computer readable medium comprising instructions, which when executed by a processing system including one or more processors, executes a method for periodically gathering data from a living subject using a sensor apparatus to be used by an autonomous robot, the method comprising:
detecting a signal transmitted by one or more first sensors of the sensor apparatus, wherein the one or more first sensors are coupled to a covering material of the sensor apparatus, the covering material configured to cover at least a portion of the living subject, wherein the covering material includes a garment covering the entire body of the living subject, headgear, footwear, and gloves;
based on the detection, receiving data from the one or more first sensors, wherein the one or more first sensors are at least one of an accelerometer, bend sensor, stretch sensor, pressure sensor, or proximity sensor, and wherein the one or more first sensors can measure movements, bending, rotations, or angular displacement of the entire body of the living subject arms, legs, joints, and extremities of the living subject in a controlled environment; and storing the data generated by the one or more first sensors, wherein the data computing device can periodically capture and save the data generated from the one or more first sensors in a data file on a storage medium, wherein the data can be retrieved from the storage medium and processed by another computing device for use by an autonomous robot in a manner such that the autonomous robot exhibits substantially the same movement or action exhibited by the living subject when the data was being captured, and wherein the another computing device can generate robot control signals for generating smooth operations performed by the autonomous robot by:

processing a first set of n consecutive time intervals of sensor data to compute a first time interval of robot control signals, wherein the first set of n consecutive time intervals of sensor data includes sensor data of i to n consecutive time intervals, and processing a second set of n consecutive time intervals of sensor data to compute a second time interval of robot control signals, wherein the second set of n consecutive time intervals of sensor data includes sensor data of i+1 to n+1 consecutive time intervals, wherein i and n represent first and last consecutive time intervals, respectively, of the first set of n consecutive time intervals, and wherein i+1 and n+1 represent first and last consecutive time intervals, respectively, of the second set of n consecutive time intervals.

16. The non-transitory computer readable medium of claim 15, wherein the data generated by the first sensors include measurements of motions, movements, change in posture, change in position, of the living subject or the immediate environment of the living subject, in the controlled environment.

17. The non-transitory computer readable medium of claim 15, further comprising:

receiving data from one or more second sensors coupled to the covering material, wherein the one or more second sensors are video cameras that can provide a plurality of views of the surroundings around the living subject in the controlled environment, and wherein the data generated by the one or more second sensors includes data related to gestures, grasping, gait, or other bodily dynamics and multi-media recordings of the living subject and the immediate environment of the living subject.

18. The non-transitory computer readable medium of claim 15, further comprising: receiving data from one or more third sensors coupled to the covering material, wherein the one or more third sensors can capture auditory sounds signals transmitted from or around the living subject in the controlled environment, and wherein the data generated by the one or more third sensors includes data related to vocalizations of the living subject and the immediate environment of the living subject.

19. The non-transitory computer readable medium of claim 15, further comprising:

receiving data from one or more fourth sensors coupled to the covering material, wherein the one or more fourth sensors are at least one of a temperature sensor, humidity sensor, barometric pressure sensor, radioactivity detector, magnetic field detector, electromagnetic radiation detector, or airborne chemical detectors from or around the living subject in the controlled environment, and wherein the data generated by the one or more fourth sensors includes data related to the environment around the living subject.

20. The non-transitory computer readable medium of claim 15, wherein, the data computing device, at each periodic capture of data, uniquely tags the data generated from the one or more sensors with an identification code, each tag identifying the sensor from which the data was generated, and wherein the data generated at each periodic capture is saved in a track or channel in the data file.

* * * * *